(12) United States Patent
Thompson

(10) Patent No.: US 12,054,238 B2
(45) Date of Patent: Aug. 6, 2024

(54) AIRFRAME AND METHOD OF MANUFACTURING AN AIRFRAME

(71) Applicant: BAE Systems plc, London (GB)

(72) Inventor: Gregory Warren Thompson, Blackburn (GB)

(73) Assignee: BAE Systems plc, London (GB)

( * ) Notice: Subject to any disclaimer, the term of this patent is extended or adjusted under 35 U.S.C. 154(b) by 183 days.

(21) Appl. No.: 17/793,745

(22) PCT Filed: Jan. 8, 2021

(86) PCT No.: PCT/GB2021/050052
§ 371 (c)(1),
(2) Date: Jul. 19, 2022

(87) PCT Pub. No.: WO2021/148774
PCT Pub. Date: Jul. 29, 2021

(65) Prior Publication Data
US 2023/0053640 A1   Feb. 23, 2023

(30) Foreign Application Priority Data

Jan. 23, 2020 (EP) .................................... 20275013
Jan. 23, 2020 (GB) .................................... 2000980

(51) Int. Cl.
| B64C 1/14 | (2006.01) |
| B29C 70/54 | (2006.01) |
| B32B 37/18 | (2006.01) |
| B32B 38/00 | (2006.01) |
| B32B 38/10 | (2006.01) |
| B32B 38/18 | (2006.01) |

(Continued)

(52) U.S. Cl.
CPC .......... B64C 1/1446 (2013.01); B29C 70/545 (2013.01); B32B 37/18 (2013.01);
(Continued)

(58) Field of Classification Search
CPC ....... B64C 1/1446; B64C 1/061; B64C 1/068; B64C 39/029; B64C 2001/0045;
(Continued)

(56) References Cited

U.S. PATENT DOCUMENTS

| 1,722,346 A | 7/1929 | Van Dusen |
| 2008/0283662 A1 | 11/2008 | Park |

(Continued)

FOREIGN PATENT DOCUMENTS

| CN | 108357673 A | 8/2018 |
| EP | 2653376 A1 | 10/2013 |

(Continued)

OTHER PUBLICATIONS

Extended European Search Report for Patent Appl. No. EP20275013.9 mail date Aug. 5, 2020, 10 pages.

(Continued)

*Primary Examiner* — Daniel H Lee
(74) *Attorney, Agent, or Firm* — Maine Cernota & Curran

(57) ABSTRACT

An airframe or a part thereof 3, for example a skin assembly or a profile such as a structural profile, comprises: a wall W having an aperture A therethrough, wherein the wall W provides a frame F surrounding, at least in part, the aperture A; a panel P conforming with the aperture A; and wherein the airframe or the part 3 thereof is configurable in: a first configuration, wherein the panel P and the frame F are mutually spaced apart; and a second configuration, wherein the panel P is received in the frame F and wherein the frame F resists movement of the panel P in two or three mutually orthogonal directions.

4 Claims, 12 Drawing Sheets

(51) Int. Cl.
  *B64C 1/06*   (2006.01)
  *B64C 39/00*  (2023.01)
  *B64F 5/10*   (2017.01)
  *B64U 20/70*  (2023.01)
  *B32B 37/26*      (2006.01)
  *B32B 38/04*      (2006.01)
  *B64C 1/00*       (2006.01)

(52) U.S. Cl.
  CPC .......... *B32B 38/0004* (2013.01); *B32B 38/10* (2013.01); *B32B 38/1808* (2013.01); *B64C 1/061* (2013.01); *B64C 1/068* (2013.01); *B64C 39/029* (2020.01); *B64F 5/10* (2017.01); *B64U 20/70* (2023.01); *B32B 2037/268* (2013.01); *B32B 2038/047* (2013.01); *B32B 2605/18* (2013.01); *B64C 2001/0045* (2013.01)

(58) Field of Classification Search
  CPC ......... B64C 1/14; B29C 70/545; B32B 37/18; B32B 38/0004; B32B 38/10; B32B 38/1808; B32B 2037/268; B32B 2038/047; B32B 2605/18; B64F 5/10; B64U 20/70; B64U 10/10; B64U 10/25; B64U 20/73

See application file for complete search history.

(56) References Cited

U.S. PATENT DOCUMENTS

| | | |
|---|---|---|
| 2009/0166473 A1 | 7/2009 | Zuniga |
| 2013/0232883 A1 | 9/2013 | Tanner |
| 2015/0040484 A1 | 2/2015 | Olch |
| 2016/0017999 A1 | 1/2016 | Boyd |
| 2018/0086010 A1* | 3/2018 | Tessier .................. B64C 27/04 |

FOREIGN PATENT DOCUMENTS

| | | |
|---|---|---|
| EP | 3202660 A1 | 8/2017 |
| EP | 3282335 A1 | 2/2018 |
| WO | 2013109305 A1 | 7/2013 |
| WO | 2020127103 A1 | 6/2020 |

OTHER PUBLICATIONS

Search Report for Patent Appl. No. GB2000980.9 mail date Nov. 4, 2020, 4 pages.

International Search Report and Written Opinion for PCT Appl. No. PCT/GB2021/050052 mail date Mar. 31, 2021, 19 pages.

International Preliminary Report on Patentability for PCT Appl. No. PCT/GB2021/050052 mail date Aug. 4, 2022, 13 pages.

* cited by examiner

AIRFRAME AND METHOD OF MANUFACTURING AN AIRFRAME

RELATED APPLICATIONS

This application is a national phase application filed under 35 USC § 371 of PCT Application No. PCT/GB2021/050052 with an International filing date of Jan. 8, 2021, which claims priority of GB Patent Application 2000980.9 filed on Jan. 23, 2020 and EP Patent Application 20275013.9 filed on Jan. 23, 2020. Each of these applications is herein incorporated by reference in its entirety for all purposes.

FIELD OF THE INVENTION

The present invention relates to airframes and methods of manufacturing airframes.

BACKGROUND

Conventional airframe manufacturing methodologies, such as monocoque or semi-monocoque manufacturing, do not afford reconfiguration, for example according to mission-specific operational requirements.

Hence, there is a need to improve airframes.

SUMMARY OF THE INVENTION

It is one aim of the present invention, amongst others, to provide an airframe and a method of manufacturing an airframe which at least partially obviates or mitigates at least some of the disadvantages of the prior art, whether identified herein or elsewhere. For instance, it is an aim of embodiments of the invention to provide an airframe that affords reconfiguration. For instance, it is an aim of embodiments of the invention to provide an airframe that facilitates assembly and/or manufacture.

A first aspect provides an airframe or part thereof comprising a set of modular cells, including a first cell comprising a set of profiles including: a first structural profile, having a first length and enclosing a first volume providing a first passageway; and a second profile, having a second length and enclosing a second volume, wherein the first passageway is arranged to receive the second profile therein.

A second aspect provides a method of assembling an airframe or part thereof comprising a set of modular cells, including a first cell comprising a set of profiles including: a first structural profile and enclosing a first volume providing a first passageway; and a second profile, having a second length and enclosing a second volume;
    wherein the method comprises:
    inserting the second profile into the first passageway.

A third aspect provides an aircraft comprising an airframe or part thereof according to the first aspect and/or assembled, at least in part, according to the method of the second aspect.

A fourth aspect provides an airframe or a part thereof, for example a skin assembly or a profile such as a structural profile, wherein the airframe or part thereof comprises:
    a wall having an aperture therethrough, wherein the wall provides a frame surrounding, at least in part, the aperture;
    a panel conforming with the aperture; and
    wherein the airframe or the part thereof is configurable in:
    a first configuration, wherein the panel and the frame are mutually spaced apart; and
    a second configuration, wherein the panel is received in the frame and wherein the frame resists movement of the panel in two or three mutually orthogonal directions.

A fifth aspect provides a method of configuring the airframe or the part thereof according to the fourth aspect, comprising:
    receiving the panel in the frame, wherein the frame resists movement of the panel in two or three mutually orthogonal directions, thereby configuring The airframe or the part thereof in the second configuration.

A sixth aspect provides a method of assembling the airframe or the part thereof according to the fourth aspect, comprising:
    receiving the panel in the frame, wherein the frame resists movement of the panel in two or three mutually orthogonal directions.

A seventh aspect provides an airframe or part thereof comprising a set of modular cells, including a first cell comprising a set of profiles including: a first structural profile, having a first length and enclosing a first volume providing a first passageway; and a second profile, having a second length and enclosing a second volume, wherein the first passageway is arranged to receive the second profile therein;
    wherein the first structural profile and/or the second profile is according to the fourth aspect; and/or
    wherein the airframe or part thereof comprises a skin assembly according to the fourth aspect, arranged to surround, at least in part, the first cell.

An eighth aspect provides a method of manufacturing an airframe or a part thereof, for example a skin assembly or a profile such as a structural profile, wherein the airframe or part thereof comprises a wall having an aperture therethrough and a panel conforming with the aperture, the method comprising:
    stacking a set of layers, including a first layer comprising a first composite material precursor and a second layer comprising a second composite material precursor, wherein stacking the set of layers comprises including a release sheet between the first layer and the second layer;
    curing the first composite material precursor and the second composite material precursor of the stacked first layer and the second layer, thereby providing a first composite material and a second composite material therefrom, respectively;
    separating the stacked first layer and the second layer, wherein the first layer and the second layer comprise the first composite material and the second composite material, respectively;
    removing the release layer from between the separated first layer and the separated second layer;
    excising a first portion and a correlated second portion respectively from the separated first layer and from the separated second layer, thereby providing therein respectively a first passageway and a correlated second passageway;
    restacking and mutually coupling the set of layers, thereby providing The airframe or the part thereof, wherein restacking and mutually coupling the set of layers comprises:
    restacking the first layer and the second layer having therein respectively the first passageway and the correlated second passageway and mutually coupling the restacked first layer and second layer, thereby providing the wall, wherein the wall has an aperture therethrough provided by the first passageway and the correlated second passageway and wherein the wall provides a frame surrounding, at least in part, the aperture;
    restacking the excised first portion and the correlated second portion and mutually coupling the restacked excised first portion and the correlated second portion, thereby providing a panel corresponding to the aperture.

A ninth aspect provides an airframe or part thereof according to the first aspect comprising a skin assembly and/or a profile, such as a structural profile, according to the fourth aspect.

A tenth aspect provides an aircraft comprising an airframe or part thereof according to the ninth aspect and/or assembled, at least in part, according to the method of the second aspect and/or the fifth aspect.

DETAILED DESCRIPTION OF THE INVENTION

According to the present invention there is provided an airframe, as set forth in the appended claims. Also provided is a method of assembling an airframe. Other features of the invention will be apparent from the dependent claims, and the description that follows.

Airframe

The first aspect provides an airframe or part thereof comprising a set of modular cells, including a first cell comprising a set of profiles including: a first structural profile, having a first length and enclosing a first volume providing a first passageway; and a second profile, having a second length and enclosing a second volume, wherein the first passageway is arranged to receive the second profile therein.

In this way, the airframe or part thereof is assembled from the set of modular cells, manufacture of which may be automated so as to provide standard modular cells, for example, facilitating assembly of the airframe or part thereof while also providing for reconfiguration and/or custom configuration of the airframe or part thereof, according to an arrangement of the set of modular cells. In other words, the airframe or part thereof is constructed from a single or multiple sections (i.e. modular cells) of a standardised, mass-produced cell, for example comprising a composite profile or tube (i.e. the first structural profile), which may be flexibly configured, for example according to mission-specific operational requirements, including in-field reconfiguration. In this way, load demands on an internal structure of the airframe or part thereof is reduced and enables introduction of novel aircraft equipping processes. Particularly, the second volume of the second profile may comprise (i.e. house) parts such as a propulsor, a fuel tank, electronics for a control system, surveillance equipment, munitions and/or part thereof, which is then received in the first passageway. These parts may be manufactured separately from the airframe or part thereof, housed in the second profile and subsequently, installed in the first structural profile. In this way, equipping, loading and/or servicing of an aircraft including the airframe or part thereof is facilitated, since second profiles comprising particular or required parts may be received in respective first structural profiles accordingly. Additionally and/or alternatively, the set of modular cells allows for segregated manufacture of the cells and/or the set of profiles including the first structural profile and the second profile, such that second profiles comprising specific parts such as propulsors, for example, may be manufactured remotely from first structural profiles arranged to receive the second profiles therein.

For example, use of a standard modular cell enables manufacturing processes to be fully automated thus ensuring higher quality and consistency along with lower cost in comparison with conventional airframe manufacturing methodologies. The airframe or part thereof aligns with air sectors manufacturing challenges, supporting high-variety, low-volume platforms, low-cost, reduced lead-time manufacture, large unitised parts and delayed differentiation (i.e. downstream customisation). In contrast, current airframe design continues to be based on conventional design and manufacturing methodologies, such that even leading-edge airframe designs incorporating composite materials, for example, tend to mimic existing airframe structures and are thus limited thereby.

Airframe

The first aspect provides the airframe or part thereof.

More generally, in one example, first aspect provides a vehicle frame or part thereof, for example the airframe or the part thereof, a landcraft frame (also known as a vehicle from or chassis) or part thereof, or a watercraft frame or part thereof.

Generally, the mechanical structure of an aircraft is known as the airframe. This structure is typically considered to include the fuselage, undercarriage, empennage and wings, and exclude the propulsor (also known as a propulsion system). In other words, the airframe provides the mechanical structure of the aircraft and lift, via the wings, and supports the propulsor. In one example, the airframe or part thereof comprises and/or provides the fuselage (i.e. an aircraft's main body section). In one example, the airframe or part thereof does not comprise and/or provide the wings. In one example, the airframe or part thereof is of a fixed-winged aircraft. In one example, the airframe or part thereof is of a rotary-winged aircraft. The aircraft may be as described with respect to the third aspect.

Set of Modular Cells

The airframe or part thereof comprises the set of modular cells, including the first cell. In other words, the cells are modules which may be combined to provide the airframe or part thereof. That is, the set of modular cells are fundamental building blocks of the airframe or the part thereof, providing, at least in part, a structure thereof and defining, at least in part, a shape thereof. In one example, the set of modular cells includes C modular cells, wherein C is a natural number greater than or equal to 1, for example 1, 2, 3, 4, 5, 6, 7, 8, 9, 10 or more. In one example, the C modular cells are each as described with respect to the first cell. In one example, the first cell comprises a set of modular sub-cells, including a first sub-cell, generally as described with respect to the first cell. In this way, the first cell may be assembled from the set of modular sub-cells. In one example, the set of modular cells includes the first cell and a second cell, wherein the first cell and optionally the second cell comprises a set of modular sub-cells, including a first sub-cell, generally as described with respect to the first cell. That is, some cells may comprise sub-cells while other cells do not. More generally, in one example, the set of modular cells recursively comprises sets of modular cells.

Set of Profiles

The first cell comprises the set of profiles, including the first structural profile and the second profile. In one example, the set of profiles includes P profiles, wherein P is a natural number greater than or equal to 1, for example 1, 2, 3, 4, 5, 6, 7, 8, 9, 10 or more.

The set of profiles includes the first structural profile, having the first length and enclosing the first volume providing the first passageway. It should be understood that the first structural profile is a structural profile. In one example, the first structural profile is arranged to provide, at least in part, the structure of the airframe and to resist, at least in part, internal and/or external forces in one, two or three dimensions. That is, the first structural profile provides, at least in part, the structural integrity of the airframe. Typically, the airframe of an aircraft provides the fuselage, undercarriage, empennage and wings. Conventionally, fuselage components include stringers, longerons, ribs, bulkheads, frames and formers. The main component of a fixed wing is a wing spar. In other words, the first structural profile performs the function of one or more of these components. It should be understood that the first structural profile is a profile, having a predefined cross sectional shape. In one example, the first structural profile has a constant cross sectional shape and/or dimension (generally, for example, cross-sectional width, height, diameter and/or area) along the first length. In one example, the first structural section has a non-constant cross-sectional shape and/or dimension along the first length. For example, the first structural section may taper or be stepped, for example monotonically, along the first length. In one example, the first structural profile is an outer profile, or example the outermost profile, having an external surface exposed to the ambient, for example. It should be understood that a length of the first passageway corresponds with (for example, is equal to or is at most) the first length of the first structural profile. It should be understood that the first structural profile encloses the first volume. In other words, the first structural profile surrounds, at least in part, the first volume i.e. a lumen. That is, the first structural profile comprises and/or is a hollow structural section. In one example, the first structural profile partially surrounds the first volume. For example, the first structural profile may comprises one or more all portions having one or more perforations therethrough, such as access ports and/or voids for weight reduction. In other words, the first structural profile may provide a frame. For example, the first structural profile may comprises one or more all portions having no perforations therethrough, for example providing a sealable enclosure for the second profile, notwithstanding means, for example an aperture, for receiving the second profile into the first passageway. It should be understood that the first volume provides the first passageway arranged to receive the second profile therein. That is, an internal shape of the first structural profile defines a shape of the first passageway.

The set of profiles includes the second profile, having the second length and enclosing the second volume. In contrast to the first structural profile, the second profile may not be a structural profile, as described with respect to the first structural profile. That is, the first second profile may not provide, at least not substantially (for example less than 50%, at most 25% preferably at most 10%), the structural integrity of the airframe. Hence, in one example, the second profile does not comprise and/or is not a structural profile. Conversely, in one example, the second profile comprises and/or is a structural profile. It should be understood that the second profile is a profile, having a predefined cross sectional shape. In one example, the second profile corresponds with the first structural profile. For example, an external shape and/or dimension of the second profile may correspond with an internal shape and/or dimension of the first structural profile i.e. of the first passageway. That is, the first passageway is arranged to receive the second profile therein. In one example, the second profile has a constant cross sectional shape and/or dimension along the second length. In one example, the second section has a non-constant cross-sectional shape and/or dimension along the second length. For example, the second section may taper or be stepped, for example monotonically, along the second length. In one example, the second profile is an inner profile, or example the innermost profile, not having an external surface exposed to the ambient, for example. It should be understood that a length of the second passageway corresponds with (for example, is equal to or is at most) the second length of the second profile. It should be understood that the second profile encloses the second volume. In other words, the second profile surrounds, at least in part, the second volume i.e. a lumen. That is, the second profile comprises and/or is a hollow structural section. In one example, the second profile partially surrounds the second volume. For example, the second profile may comprises one or more all portions having one or more perforations therethrough, such as access ports and/or voids for weight reduction. In other words, the second profile may provide a frame. In one example, the second profile may comprises one or more wall portions having no perforations therethrough, for example providing a sealable enclosure for the second profile.

In one example, the set of profiles comprises a third profile, generally as described with respect to the second profile. That is, the first passageway may be arranged to receive the second profile and the third profile, for example simultaneously and/or alternately. For example, the first passageway may be arranged to receive the second profile and the third profile simultaneously for example in series, such as end-to-end, or in parallel, such as side-by-side. In this way, specific second and third profiles may be received in the first structural profile together. For example, the first passageway may be arranged to receive the second profile and the third profile alternately for example by replacing the second profile with the third profile. In this way, the second profile may be swapped with the third profile, for example flexibly reconfigured, for example according to mission-specific operational requirements, and/or for maintenance.

Passageway

The first passageway is arranged to receive the second profile therein, as described above. That is, the first passageway has a shape and/or dimension corresponding with a shape and/or dimension of the second profile. In one example, the first passageway is arranged to partially receive the second profile therein. In one preferred example, the first passageway is arranged to fully (i.e. completely) receive the second profile therein. In one example, the first structural profile comprises an aperture, for example an access door such as at an end thereof, arranged to receive the second profile therethrough.

In one example, the first passageway is arranged to slidably receive the second profile therein. In this way, the second profile may be slidably inserted into and/or removed from the first passageway.

In one example, the first passageway comprises no bulkheads therein. In other words, the first passageway may be uninterrupted. More generally, in one example, the first passageway comprises no obstructions. In this way, receiving of the second profile therein may be facilitated.

In one example, an external shape, preferably cross-sectional shape and/or dimension, of the second profile corresponds with, for example is the same as, an internal shape, preferably cross-sectional shape and/or dimension, of the first structural profile (i.e. of the first passageway). In this way, voids (i.e. unfilled volumes) are reduced, thereby improving space utilisation.

In one example, the second volume is configured to comprise and/or comprises a propulsor, a fuel tank, electronics for a control system, surveillance equipment, munitions and/or part thereof. In this way, the airframe or part thereof may be flexibly configured, for example according to mission-specific operational requirements. For example, the same first structural profile, as part of a given airframe or aircraft, may receive therein a particular second profile comprising a fuel tank for a long-range first mission, another particular second profile comprising munitions for a second defence mission and yet another second particular profile comprising surveillance equipment for a third reconnaissance mission.

In one example, the airframe or part thereof is arrangeable in:
a first arrangement, wherein the second profile is received (i.e. inserted) in the first passageway; and
a second arrangement, wherein the second profile is removed from the first passageway.

In one example, the airframe or part thereof is repeatedly arrangeable in the first arrangement and in the second arrangement. That is, the second profile may be inserted into and removed from the first passageway, repeatedly.

In one example, the set of modular cells includes a second cell. The second cell may be as described with respect to the first cell. That is, the cells may be similar, notwithstanding that the respective second profiles thereof may comprise different parts such as propulsors, fuel tanks, electronics for control systems, surveillance equipment, munitions and/or parts thereof. In one example, respective first structural profiles of the first cell and the second cell are similar, for example the same and/or mirrors (i.e. paired).

In one example, the first cell and the second cell are mutually coupled. That is, the first cell and the second cell may be coupled (i.e. attached) together. In this way, the airframe or part thereof is composed of a plurality of cells. In one example, the first cell and the second cell are mutually coupled chemically, for example adhesively, by bonding, and/or by fusion, and/or mechanically, for example using mechanical fasteners such as non-releasable fasteners for example non-threaded fasteners (e.g. rivets) and/or releasable fasteners for example clips, rings, toggle bolts, clamps and/or threaded fasteners (e.g. bolts and nuts).

In one example, the first cell and the second cell are mutually releasably coupled, for example mechanically such as using releasable mechanical fasteners. In this way, the first cell and the second cell may be coupled, for example during manufacture of the airframe or part thereof, and uncoupled, for example during maintenance and/or reconfiguration.

In one example, the first cell and the second cell are mutually reconfigurably coupled, for example mechanically, as described above. In one example, the first cell and the second cell are mutually reconfigurably coupled mechanically, using releasable fasteners positioned in pre-determined positions. In this way, the first cell and/or the second cell may be interchanged by other cells.

In one example, the first cell and the second cell are mutually interlockably coupled, for example mechanically. For example, the first cell and the second cell may comprise corresponding mating fixtures, such as pins and/or dovetails, arranged to mutually interlockably couple the first cell and the second cell and thereby resist forces in one, two or three dimensions. For example, the mating fixtures may resist relative axial movement of the first cell and the second cell.

In one example, the set of modular cells includes a third cell and the first cell, the second cell and the third cell are mutually coupled, for example as described with respect to the first cell and the second cell. In this way, the airframe or part thereof may be enlarged to include additional cells. Similarly, the airframe or part thereof may be reduced to include fewer cells.

In one example, the airframe or part thereof is configurable in:
a first configuration, wherein the first cell, the second cell and the third cell are mutually coupled; and
a second configuration, wherein the first cell and the second cell are mutually coupled, wherein the first cell and the third cell are mutually coupled and wherein the second cell and the third cell are not mutually coupled.

In this way, the airframe or part thereof may be flexibly configured.

In one example, the airframe or part thereof is repeatedly configurable in the first configuration and in the second configuration. That is, the first cell, the second cell and the third cell may be mutually coupled and uncoupled, repeatedly.

In one example, the airframe or part thereof is configurable in:
a third configuration, wherein the first cell and the second cell are mutually coupled, wherein the second cell and the third cell are mutually coupled and wherein the first cell and the third cell are not mutually coupled.

In this way, the airframe or part thereof may be flexibly configured. Particularly, the first cell, the second cell and third cell may be interchangeably configured by mutually coupling, as described.

In one example, the airframe or part thereof is repeatedly configurable in the first configuration, in the second configuration and in the third configuration. That is, the first cell, the second cell and the third cell may be mutually coupled and uncoupled, repeatedly.

In one example, an external shape, preferably cross-sectional shape, of the first structural profile tessellates. That is, cells may be arranged adjacently and/or repeatedly, without gaps therebetween. Generally, regular polygons, having congruent straight sides, tessellate. Other shapes tessellate.

In one example, the external shape, preferably cross-sectional shape, of the first structural profile comprises and/or is a hexagon. In this way, a complexity of the first shape is reduced while providing a good balance between mechanical properties and aerodynamic properties.

In one example, the airframe comprises a skin arranged to surround, at least in part, the first cell. In this way, drag in use due to air may be reduced. That is, an aerodynamic property of the airframe may be improved. In one example, the skin is removable, for example removably mechanically, magnetically and/or electromagnetically attached to the first structural profile. In this way, the skin for the airframe may be replaced and/or flexibly configured, for example according to mission-specific operational requirements, including in-field reconfiguration. That is, the aerodynamic property of the airframe and/or a shape or profile thereof may be selectively varied. By selectively varying the shape or profile of the airframe, reconnaissance of the airframe, for example by hostile forces, is more complex. Replacement of the skin may be required due to wear due to erosion at, for example hypersonic speeds, and/or damage thereto.

Composite Material

In one example, the set of cells comprises a composite material, for example a fibre reinforced composite material such as including carbon fibre. In one example, the first structural profile and/or the second profile comprises such a composite material. Particularly, the use of advanced composites improves the structural strength, stiffness, corrosion and chemical resistance along with enabling significant reductions in weight. With increased use of carbon fibre in aircraft structures comes an opportunity to introduce novel structures which challenge the traditional design methodologies and manufacturing processes.

In one example, the composite material comprises reinforcement fibres surrounded, at least in part, by a polymeric composition i.e. a fibre reinforced composite material.

In one example, the reinforcement fibres comprise non-metal fibres for example glass fibres such as A-glass, E-glass, E-CR-glass, C-glass, D-glass, R-glass, S-glass, S-2-glass and HS-glass; carbon fibres such as aerospace or industrial grades of IM2A, IM2C, IM5, IM6, IM7, IM8, IM9, IM10, AS4, AS4A, AS4C, AS4D, AS7, HM50 and HM63; aramid fibres such as Kevlar®, Nomex® and Technora®; Ultra-High Molecular Weight Polyethylene (UHMwPE) fibres such as Dyneema®; and/or mixtures thereof. In one example, the reinforcement fibres comprise metal and/or alloy fibres for example titanium, aluminium and/or copper and/or alloys thereof; stainless steel fibres; and/or mixtures thereof. In one example, the reinforcement fibre comprise a mixture of non-metal and metal fibres.

In one example, the reinforcement fibres have a diameter in a range from 2 μm to 100 μm, preferably in a range from 4 μm to 50 μm, more preferably in a range from 5 μm to 20 μm, most preferably in a range from 6 μm to 10 μm, for example 6 μm, 7 μm, 8 μm, 9 μm or 10 μm. Typically, suitable carbon fibres have a diameter in a range from 7 μm to 10 μm and suitable glass fibres have a diameter in a range from 4 μm to 20 μm.

In one example, a volume fraction $V_f$ of the reinforcement fibres is in a range from 10% to 70%, preferably in a range from 20% to 60%, for example 30%, 40% or 50%, by volume of the filament. In this way, a relatively high volume fraction $V_f$ of the first set of reinforcement fibres in the filament may be provided, thereby increasing a mechanical property of the composite material.

In one example, the polymeric composition comprises a first thermoplastic, selected from a group comprising acrylonitrile butadiene styrene (ABS), polylactic acid (PLA), polycarbonate (PC), polyamide (PA), polystyrene (PS), high-density polyethylene (HDPE), PC/ABS, polyethylene terephthalate (PETG), polyphenylsulfone (PPSU), high impact polystyrene (HIPS), polytetrafluoroethylene (PTFE), lignin, rubber, and/or a polyaryletherketone (PAEK), such as polyetherketoneketone (PEKK), polyetheretherketone (PEEK) and polyetherimide (PEI). In one example, the first thermoplastic comprises, consists of and/or is PEKK, PEEK and/or PEI, preferably PEKK and/or PEEK, more preferably PEKK. Compared with PEEK, a PEKK is more robust (i.e. less sensitive) to cooling rate, due, at least in part, to a wider range of acceptable crystallinity. In one example, the first polymeric composition comprises a reactive thermoplastic resin, such as Elium®. Elium is a liquid monomer that may be processed like a thermoset but upon reaction, transforms into a thermoplastic which may be subsequently thermoformed, melted and/or welded. Anionic polymerization of caprolactam (a monomer of polyamide-6, PA-6) is also suitable. Generally, reactive thermoplastic resins may be cured, for example by heating and/or using a catalyst included in the first polymeric composition, thereby reacting molecules thereof to provide a thermoplastic having improved mechanical properties. In one example, the first polymeric composition comprises a second thermoplastic, as described above with respect to the first thermoplastic (i.e. a copolymer).

In one example, the composite material is provided, at least in part, by fibre placement, braiding, knitting, weaving, pull winding and/or pultrusion.

Method of Assembling an Airframe

The second aspect provides a method of assembling an airframe or part thereof comprising a set of modular cells, including a first cell comprising a set of profiles including: a first structural profile having a first length and enclosing a first volume providing a first passageway; and a second profile, having a second length and enclosing a second volume;
wherein the method comprises:
inserting the second profile into the first passageway.

The airframe, the part thereof, the set of modular cells, the first cell, the set of profiles, the first structural profile, the first length, the first volume, the first passageway, the second profile, the second length and/or the second volume may be as described with respect to the first aspect.

In one example, the method comprises and/or is a method of assembling the airframe or part thereof according to the first aspect.

In one example, inserting the second profile into the first passageway comprises slidably inserting the second profile into the first passageway.

In one example, the method comprises removing the second profile from the first passageway. In one example, the method comprises repeatedly inserting the second profile into the first passageway and removing the second profile from the first passageway.

In one example, method comprises:
arranging the airframe or part thereof in a first arrangement, wherein the second profile is received (i.e. inserted) in the first passageway; and
arranging the airframe or part thereof in a second arrangement, wherein the second profile is removed from the first passageway.

In one example, method comprises repeatedly arranging the airframe or part thereof in the first arrangement and in the second arrangement.

In one example, the set of modular cells includes a third cell and the first cell, the second cell and the third cell are mutually coupled, for example as described with respect to the first cell and the second cell. In this way, the airframe or part thereof may be enlarged to include additional cells. Similarly, the airframe or part thereof may be reduced to include fewer cells.

In one example, set of cells includes a third cell and the method comprises:
configuring the airframe or part thereof in a first configuration, wherein the first cell, the second cell and the third cell are mutually coupled; and
configuring the airframe or part thereof in a second configuration, wherein the first cell and the second cell are mutually coupled, wherein the first cell and the third cell are mutually coupled and wherein the second cell and the third cell are not mutually coupled.

In one example, the method comprises repeatedly configuring the airframe or part thereof in the first configuration and in the second configuration.

In one example, the method comprises:
configuring the airframe or part thereof in a third configuration, wherein the first cell and the second cell are mutually coupled, wherein the second cell and the third cell are mutually coupled and wherein the first cell and the third cell are not mutually coupled.

Aircraft

The third aspect provides an aircraft comprising an airframe or part thereof according to the first aspect and/or assembled, at least in part, according to the method of the second aspect.

In one example, the aircraft comprises and/or is a fixed-winged aircraft. In one example, the aircraft comprises and/or is a rotary-winged aircraft.

In one example, the aircraft comprises and/or is an unmanned and/or autonomous vehicle for example an unmanned aerial vehicle, UAV. Generally, an unmanned aircraft (also known as an uncrewed aircraft) is an aircraft without a person on board. An unmanned aircraft can either be a remote controlled aircraft (also known as a remote guided aircraft) or an autonomous aircraft, capable of sensing its environment and navigating autonomously. Preferably, the aircraft is a UAV. An unmanned aerial vehicle (UAV), commonly known as a drone, is an aircraft without a human pilot on board. UAVs are a component of an unmanned aircraft system (UAS); which include a UAV, a ground-based controller, and a system of communications between the two. The flight of UAVs may operate with various degrees of autonomy: either under remote control by a human operator or autonomously by onboard computers. Compared with manned aircraft, UAVs were originally used for missions too 'dull, dirty or dangerous' for humans. While they originated mostly in military applications, their use is rapidly expanding to commercial, scientific, recreational, agricultural, and other applications, such as policing, peacekeeping, and surveillance, product deliveries, aerial photography, smuggling, and drone racing. Civilian UAVs now vastly outnumber military UAVs. UAVs typically fall into one of six functional categories (although multi-role airframe platforms are becoming more prevalent): target and decoy (providing ground and aerial gunnery a target that simulates an enemy aircraft or missile); reconnaissance (providing battlefield intelligence); combat (providing attack capability for high-risk missions); logistics (delivering cargo); research and development (improve UAV technologies); civil and/or commercial UAVs (for example, agriculture, aerial photography, data collection). In one example, the aircraft is a military UAV. UAVs may be classified according to gross take off weight (GTOW): micro air vehicle (MAV) (the smallest UAVs that can weigh less than 1 g); miniature UAV (also called SUAS) (approximately less than 25 kg); and heavier UAVs (i.e. 25 kg or more). In one example, the UAV is a miniature UAV or a heavier UAV. In one example, the UAV has a GTOW in a range from 2.5 kg to 2500 kg, preferably in a range from 5 kg to 500 kg, more preferably in a range from 10 kg to 125 kg, most preferably in a range from 12.5 kg to 50 kg; and/or a payload in a range from 0.5 kg to 500 kg, preferably in a range from 1 kg to 250 kg, more preferably in a range from 2 kg to 100 kg, most preferably in a range from 3 kg to 25 kg; and/or a flight time (i.e. a maximum flight duration) in a range from 0.5 hours to 24 hours, preferably in a range from 0.75 hours to 12 hours, more preferably in a range from 1 hour to 4 hours.

Airframe or Part Thereof

The fourth aspect provides an airframe or a part thereof, for example a skin assembly or a profile such as a structural profile, wherein the airframe or part thereof comprises:
a wall having an aperture therethrough, wherein the wall provides a frame surrounding, at least in part, the aperture;
a panel conforming with the aperture; and
wherein the airframe or the part thereof is configurable in:
a first configuration, wherein the panel and the frame are mutually spaced apart; and
a second configuration, wherein the panel is received in the frame and wherein the frame resists movement of the panel in two or three mutually orthogonal directions.

In this way, the panel (for example, an access panel) conforms with the aperture in the wall and is receivable in the frame, thereby closing the aperture. Since the frame resists movement of the panel in two or three mutually orthogonal directions, structural integrity of the airframe or the part thereof is improved.

The airframe or part thereof comprises the wall, for example a structural wall and/or a skin, having the aperture therethrough. Generally, the skin of an aircraft is the outer surface which covers much of its wings and airframe, for example fuselage. The aperture provides access into an interior volume of the airframe. In one example, the aperture has an area in a range from 25 cm$^2$ to 1 m2, preferably in a range from 100 cm$^2$ to 2,500 cm$^2$, more preferably in a range from 500 cm$^2$ to 1,000 cm$^2$. The wall provides the frame surrounding, at least in part, the aperture. It should be understood that the frame is arranged to receive the panel therein, for example by having a shape and/or dimensions suitable for receiving the panel. The panel conforms with the aperture, for example having the same shape, differing in dimensions such that the panel is receivable in the frame. In one example, a shape of the aperture and a shape of the panel are similar, for example, the same shape. In one example, a dimension of the aperture is larger than a dimension of the panel. In one example, a first gap, for example a boundary or interface gap (i.e. an annular gap or a peripheral gap), between the aperture, for example the frame, and the gap is at most 500 µm, preferably at most 250 µm, more preferably at most 125 µm, most preferably at most 50 µm. The airframe or the part thereof is configurable in the first configuration, wherein the panel and the frame are mutually spaced apart. That is, the panel and the wall are separable. The airframe or the part thereof is configurable in the second configuration, wherein the panel is received in the frame and wherein the frame resists movement of the panel in two or three mutually orthogonal directions.

In one example, the frame defines a female coupling member and wherein the panel defines a mating male coupling member. In this way, the frame and the panel mutually couple. That is, the frame and the panel are couplable, for example releasably couplable, for example repeatedly.

In one example, the frame includes a first shoulder (also known as a rabbet or landing region), wherein the panel includes a second shoulder and wherein respective surfaces of the first shoulder and the second shoulder confront and/or contact in the second configuration. In this way, the first shoulder and the second shoulder resist movement of the panel in two or three mutually orthogonal directions.

In one example, the airframe or part thereof comprises a set of coupling fasteners, preferably releasable fasteners, arranged to mutually fasten the frame and the panel in the second configuration. Suitable fasteners are known. In one example, the panel is fully removable (i.e. separable) from the frame. In one example, The airframe or the part thereof does not comprise a hinge. In this way, the panel is fully removable (i.e. separable) from the frame.

In one example, respective thicknesses of the wall and of the panel are substantially similar, for example wherein a ratio of the respective thicknesses is in a range from 2:1 to 1:2, preferably in a range from 3:2 to 2:3, more preferably in a range from 5:4 to 4:5, most preferably in a range from 11:10 to 10:11, for example 1:1.

In one example, the wall and the panel comprise a composite material or a plurality thereof. The composite material may be as described herein with respect to the first aspect.

In one example, the airframe or the part thereof comprises and/or is a skin assembly for the airframe or the part thereof and the wall comprises and/or is a skin for the airframe or the part thereof.

Method of Configuring

The fifth aspect provides a method of configuring the airframe or the part thereof according to the fourth aspect, comprising:

receiving the panel in the frame, wherein the frame resists movement of the panel in two or three mutually orthogonal directions, thereby configuring the airframe or the part thereof in the second configuration.

In this way, the panel may be inserted into the wall. Since the frame resists movement of the panel in two or three mutually orthogonal directions, structural integrity of the airframe or the part thereof is improved.

In one example, the method comprises:

mutually spacing apart the panel and the frame, thereby configuring The airframe or the part thereof in the first configuration.

In this way, the panel may be extracted from the wall, thereby allowing access into the airframe, for example.

Method of Assembling

The sixth aspect provides a method of assembling the airframe or the part thereof according to the fourth aspect, comprising:

receiving the panel in the frame, wherein the frame resists movement of the panel in two or three mutually orthogonal directions.

Airframe

The seventh aspect provides an airframe or part thereof comprising a set of modular cells, including a first cell comprising a set of profiles including: a first structural profile, having a first length and enclosing a first volume providing a first passageway; and a second profile, having a second length and enclosing a second volume, wherein the first passageway is arranged to receive the second profile therein;

wherein the first structural profile and/or the second profile is according to the fourth aspect; and/or wherein the airframe or part thereof comprises a skin assembly according to the fourth aspect, arranged to surround, at least in part, the first cell.

The airframe or part thereof may be as described with respect to the first aspect.

If the airframe or part thereof comprises the skin assembly arranged to surround, at least in part, the first cell, in this way, drag in use due to air may be reduced. That is, an aerodynamic property of the airframe may be improved. In one example, the skin is removable, for example removably mechanically, magnetically and/or electromagnetically attached to the first structural profile. In this way, the skin for the airframe may be replaced and/or flexibly configured, for example according to mission-specific operational requirements, including in-field reconfiguration. That is, the aerodynamic property of the airframe and/or a shape or profile thereof may be selectively varied. By selectively varying the shape or profile of the airframe, reconnaissance of the airframe, for example by hostile forces, is more complex. Replacement of the skin may be required due to wear due to erosion at, for example hypersonic speeds, and/or damage thereto.

In one example, the airframe or the part thereof is removable from the airframe.

Method of Manufacturing

The eighth aspect provides a method of manufacturing an airframe or a part thereof, for example a skin assembly or a profile such as a structural profile, wherein the airframe or part thereof comprises a wall having an aperture therethrough and a panel conforming with the aperture, the method comprising:

stacking a set of layers, including a first layer comprising a first composite material precursor and a second layer comprising a second composite material precursor, wherein stacking the set of layers comprises including a release sheet between the first layer and the second layer;

curing the first composite material precursor and the second composite material precursor of the stacked first layer and the second layer, thereby providing a first composite material and a second composite material therefrom, respectively;

separating the stacked first layer and the second layer, wherein the first layer and the second layer comprise the first composite material and the second composite material, respectively;

removing the release layer from between the separated first layer and the separated second layer;

excising a first portion and a correlated second portion respectively from the separated first layer and from the separated second layer, thereby providing therein respectively a first passageway and a correlated second passageway;

restacking and mutually coupling the set of layers, thereby providing The airframe or the part thereof, wherein restacking and mutually coupling the set of layers comprises:

restacking the first layer and the second layer having therein respectively the first passageway and the correlated second passageway and mutually coupling the restacked first layer and second layer, thereby providing the wall, wherein the wall has an aperture therethrough provided by the first passageway and the correlated second passageway and wherein the wall provides a frame surrounding, at least in part, the aperture;

restacking the excised first portion and the correlated second portion and mutually coupling the restacked excised first portion and the correlated second portion, thereby providing a panel corresponding to the aperture.

By curing the stacked layers (i.e. together) having the release sheet between the first layer and the second layer, a shape (for example a three dimensional shape) of the first layer and a shape of the second layer are analogous. For example, the stacked set of layers may include the first layer comprising a concave outer surface and the second layer comprising an analogous convex inner surface (and/or vice versa), including the release layer between the concave outer surface and the analogous convex inner surface. In this way, complex three-dimensional shapes of the set of layers of The airframe or the part thereof may be cured together, for example in the same mould set or tool set, and the first layer and the second layer subsequently separated. In contrast, conventional curing of the first layer and the second layer independently requires analogous moulds or tool sets, which is thus more complex and/or not possible practically. For example, independent curing of the first layer and the second layer may result in differing distortions and/or result in non-analogous shapes thereof.

Since the first layer and the second layer after curing are separable, the first portion and the correlated second portion are independently excisable therefrom respectively. That is, the first portion and the correlated second portion comprise the first composite material and the second composite material respectively (i.e. the cured first composite material precursor and the cured second composite material precursor respectively). In this way, respective shapes of the first portion and the correlated second portion are maintained during and after excision since the respective composite materials are cured. Similarly, respective shapes of the separated first layer and the separated second layer and of the first passageway and the correlated second passageway respectively therein are maintained during and after excision since the respective composite materials are cured. In contrast, excising the first portion and/or the second portion from the uncured first layer and/or the uncured second layer respectively may result in differing distortions and/or result in non-correlated shapes thereof.

The restacked first layer and second layer having therein respectively the first passageway and the correlated second passageway are mutually coupled, thereby providing the wall, wherein the wall has the aperture and wherein the wall provides a frame surrounding, at least in part, the aperture. The restacked excised first portion and correlated second portion are mutually coupled, thereby providing a panel corresponding to the aperture in the wall. It should be understood that restacking and mutually coupling the set of layers does not comprise including the release sheet and/or a release sheet between the first layer and the second layer.

In this way, dimensional tolerances of the wall, the aperture and/or the panel are improved, thereby providing the airframe or the part thereof according to the fourth aspect, for example.

In one example, the airframe or the part thereof is configurable in:
a first configuration, wherein the panel and the frame are mutually spaced apart; and
a second configuration, wherein the panel is received in the frame and wherein the frame resists movement of the panel in two or three mutually orthogonal directions.

The first composite material and/or the second composite material may be as described with respect to the composite material of the first aspect.

In one example, the method comprises providing the first layer and/or the second layer, at least in part, by fibre placement, braiding, knitting and/or weaving.

In one example, excising the first portion and the correlated second portion respectively from the separated first layer and from the separated second layer comprises thermal cutting, for example laser cutting, plasma cutting or electron beam cutting. In this way, dimensional tolerances of the wall, the aperture and/or the panel are improved. In one example, excising the first portion and the correlated second portion respectively from the separated first layer and from the separated second layer does not comprise mechanical cutting, for example by machining with a rotating and/or reciprocating tool and/or with a blade.

In one example, a first gap, for example a boundary or interface gap, between the excised first portion and the first passageway in the first layer is at most 500 μm, preferably at most 250 μm, more preferably at most 125 μm, most preferably at most 50 μm. In this way, a fit up between the panel and the frame may be tightly controlled.

Airframe

The ninth aspect provides an airframe or part thereof according to the first aspect comprising a skin assembly and/or a profile, such as a structural profile, according to the fourth aspect.

Aircraft

A tenth aspect provides an aircraft comprising an airframe or part thereof according to the ninth aspect and/or assembled, at least in part, according to the method of the second aspect and/or the fifth aspect.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
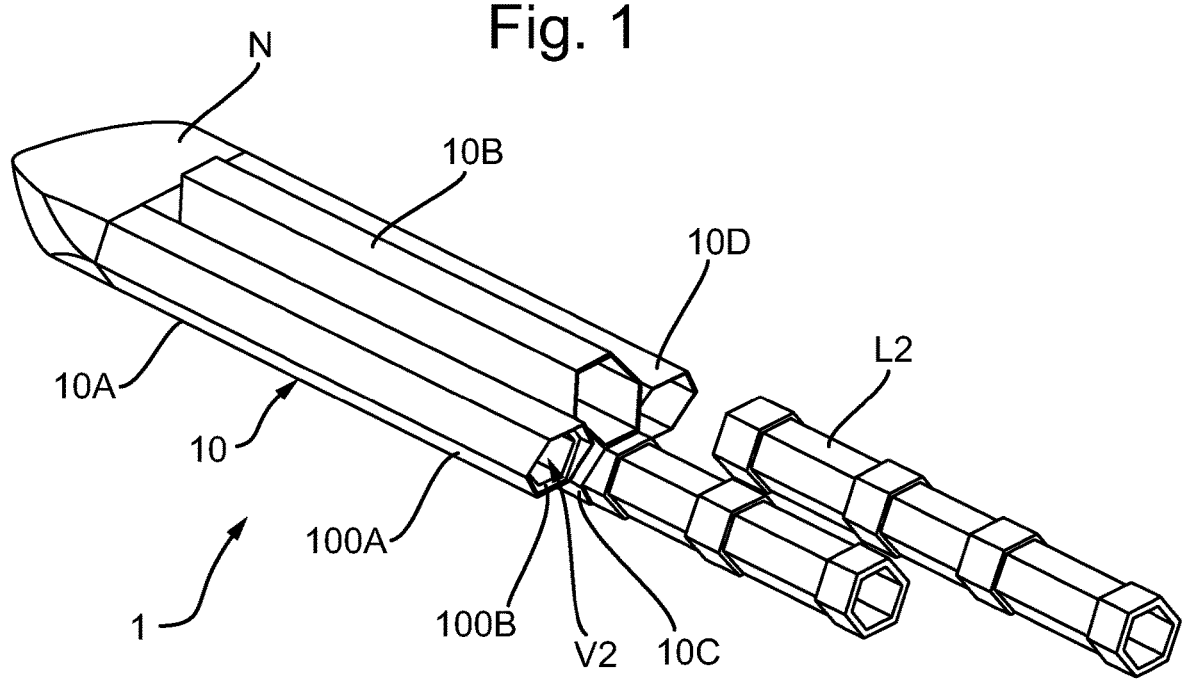
FIG. 1 schematically depicts an airframe or part thereof according to an exemplary embodiment.
Figure 2:
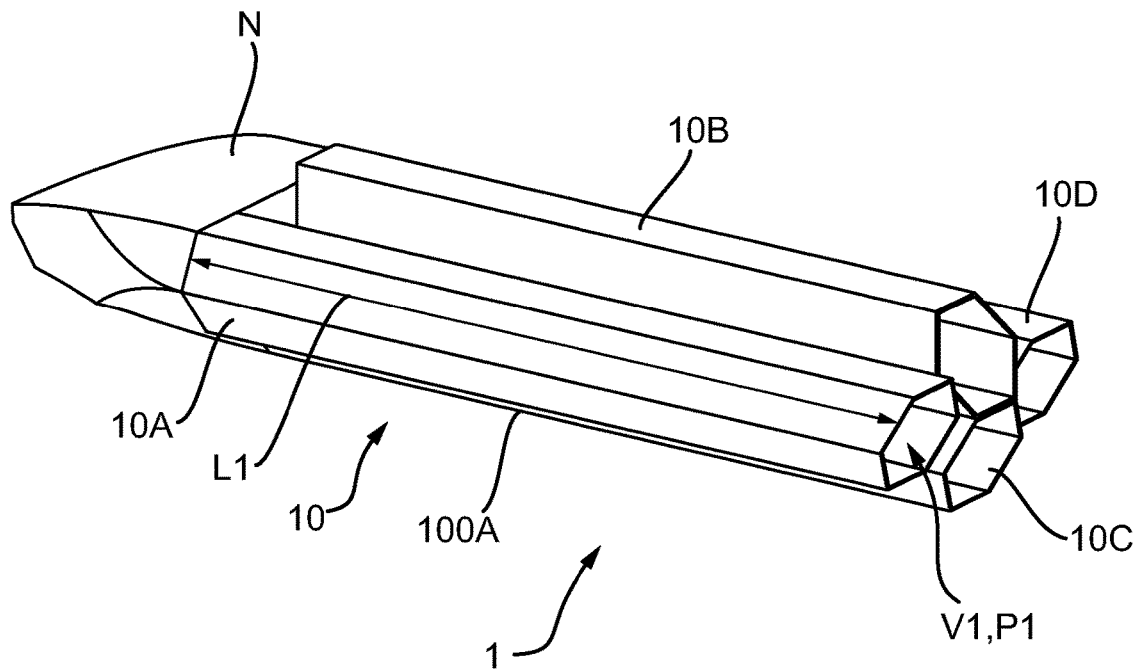
FIG. 2 schematically depicts a rear perspective view of the airframe or part thereof of FIG. 1, in more detail.
Figure 3:
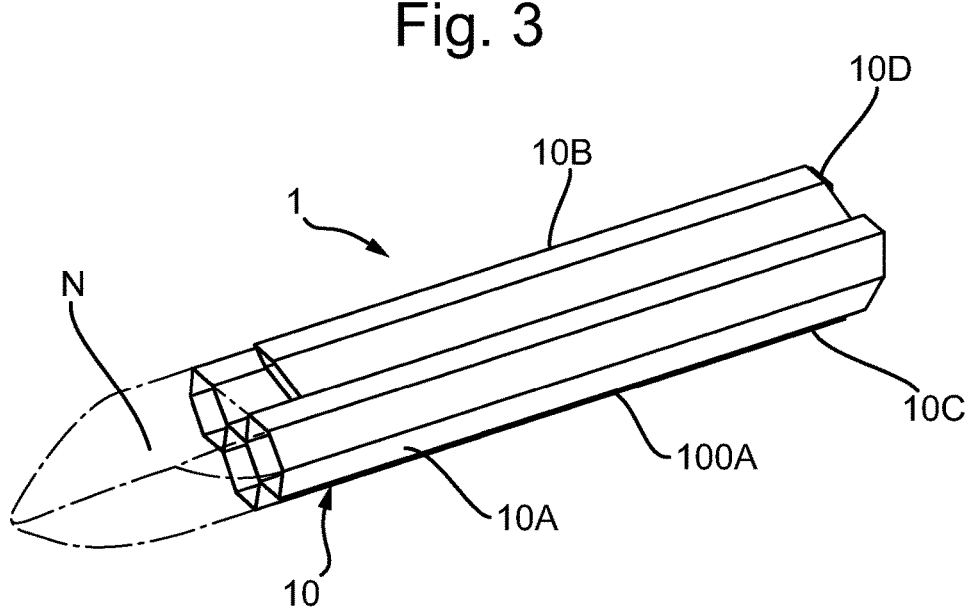
FIG. 3 schematically depicts a front perspective view of the airframe or part thereof of FIG. 1, in more detail.
Figure 4:
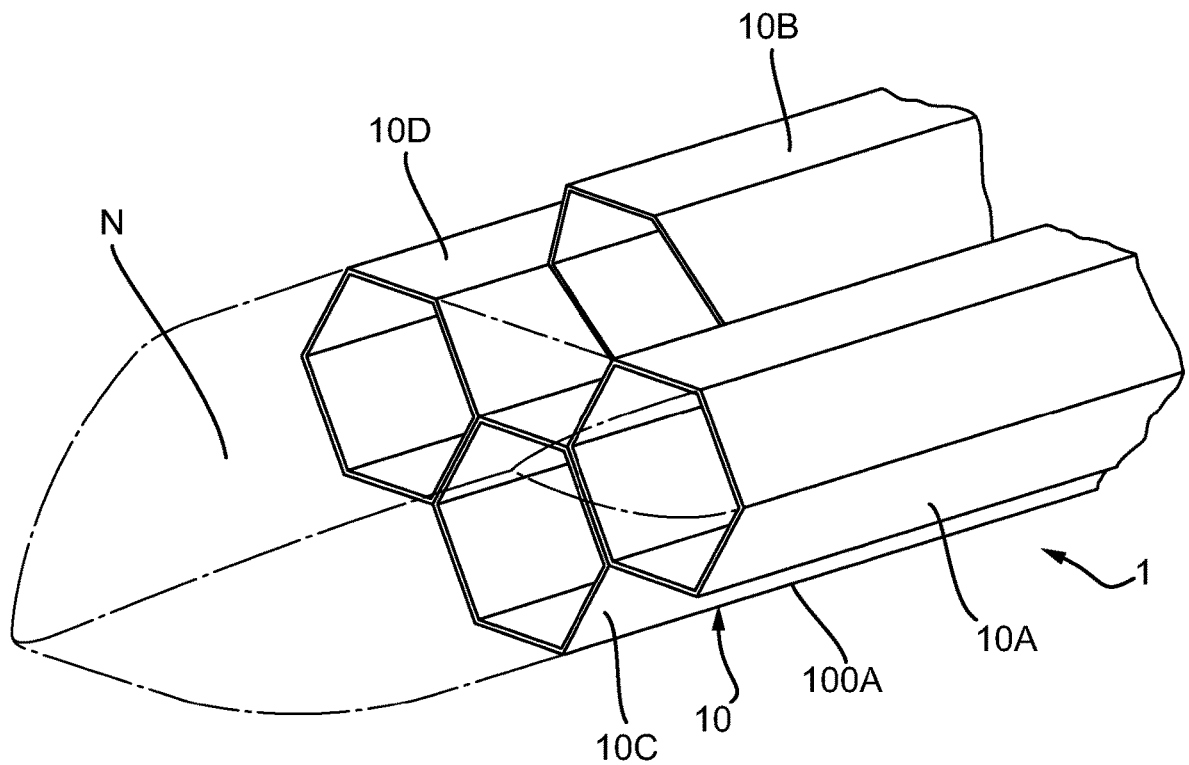
FIG. 4 schematically depicts a side elevation of the airframe or part thereof of FIG. 1, in more detail.

FIG. 1 schematically depicts an airframe 1 or part thereof according to an exemplary embodiment. FIG. 2 schematically depicts a rear perspective view of the airframe 1 or part thereof of FIG. 1, in more detail. FIG. 3 schematically depicts a front perspective view of the airframe 1 or part thereof of FIG. 1, in more detail. FIG. 4 schematically depicts a side elevation of the airframe 1 or part thereof of FIG. 1, in more detail.

The airframe 1 or part thereof comprises a set of modular cells 10, including a first cell 10A comprising a set of profiles 100 including: a first structural profile 100A, having a first length L1 and enclosing a first volume V1 providing a first passageway P1; and a second profile 100B, having a second length L2 and enclosing a second volume V2, wherein the first passageway P1 is arranged to receive the second profile 100B therein.

In this example, the airframe 1 or part thereof comprises and/or provides the fuselage (i.e. an aircraft's main body section). In this example, the airframe 1 or part thereof does not comprise and/or provide the wings.

In this example, the set of modular cells 10 includes 4 modular cells 10A, 10B, 10C, 10D. In this example, the 4 modular cells 10 are each as described with respect to the first cell 10A.

The first cell 10A comprises the set of profiles 100, including the first structural profile 100A and the second profile 100B.

In this example, the first structural profile 100A is arranged to provide, at least in part, the structure of the airframe 1 and to resist, at least in part, internal and/or external forces in one, two or three dimensions. In this example, the first structural profile 100A has a constant cross sectional shape and/or dimension (generally, for example, cross-sectional width, height, diameter and/or area) along the first length L1. In this example, the first structural profile 100A is an outer profile, or example the outermost profile, having an external surface, exposed to the ambient, for example. In this example, the first structural profile 100A partially surrounds the first volume V1, comprising an access port.

In this example, the second profile 100B does not comprise and/or is not a structural profile. In this example, an external shape and/or dimension of the second profile 100B corresponds with an internal shape and/or dimension of the first structural profile 100A i.e. of the first passageway P1. In this example, the second profile 100B has a constant cross sectional shape and/or dimension along the second length L2. In one example, the second profile 100B is an inner profile, or example the innermost profile, not having an external surface exposed to the ambient, for example. In this example, the second profile 100B comprises one or more wall portions having no perforations therethrough, for example providing a sealable enclosure for the second profile 100B.

In this example, the first passageway P1 is arranged to fully (i.e. completely) receive the second profile 100B therein. In this example, the first structural profile comprises an aperture, for example an access door such as at an end thereof, arranged to receive the second profile 100B therethrough.

In this example, the first passageway P1 is arranged to slidably receive the second profile 100B therein.

In this example, the first passageway P1 comprises no bulkheads therein. More generally, in this example, the first passageway P1 comprises no obstructions.

In this example, an external shape, preferably cross-sectional shape and/or dimension, of the second profile 100B corresponds with, for example is the same as, an internal shape, preferably cross-sectional shape and/or dimension, of the first structural profile (i.e. of the first passageway P1).

In this example, the second volume V2 is configured to comprise and/or comprises a propulsor, a fuel tank, electronics for a control system, surveillance equipment, munitions and/or part thereof.

In this example, the airframe 1 or part thereof is arrangeable in:

a first arrangement, wherein the second profile 100B is received (i.e. inserted) in the first passageway P1; and a second arrangement, wherein the second profile 100B is removed from the first passageway P1.

In this example, the airframe 1 or part thereof is repeatedly arrangeable in the first arrangement and in the second arrangement.

In this example, the set of modular cells 10 includes a second cell 10B. The second cell 10B is as described with respect to the first cell 10A.

In this example, the first cell 10A and the second cell 10B are mutually coupled. In this example, the first cell 10A and the second cell 10B are mutually coupled mechanically, for example using mechanical fasteners such as non-releasable fasteners for example non-threaded fasteners (e.g. rivets) and/or releasable fasteners for example clips, rings, toggle bolts, clamps and/or threaded fasteners (e.g. bolts and nuts).

In this example, the first cell 10A and the second cell 10B are mutually releasably coupled, for example mechanically such as using releasable mechanical fasteners.

In this example, the first cell 10A and the second cell 10B are mutually reconfigurably coupled, for example mechanically, as described above. In this example, the first cell 10A and the second cell 10B are mutually reconfigurably coupled mechanically, using releasable fasteners positioned in predetermined positions.

In this example, the first cell 10A and the second cell 10B are mutually interlockably coupled, for example mechanically.

In this example, the set of modular cells 10 includes a third cell 10C and the first cell 10A, the second cell 10B and the third cell 10C are mutually coupled, for example as described with respect to the first cell 10A and the second cell 10B.

In this example, the airframe 1 or part thereof is configurable in:

a first configuration, wherein the first cell 10A, the second cell 10B and the third cell 10C are mutually coupled; and a second configuration, wherein the first cell 10A and the second cell 10B are mutually coupled, wherein the first cell 10A and the third cell 10C are mutually coupled and wherein the second cell 10B and the third cell 10C are not mutually coupled.

In this example, the airframe 1 or part thereof is repeatedly configurable in the first configuration and in the second configuration. That is, the first cell 10A, the second cell 10B and the third cell 10C may be mutually coupled and uncoupled, repeatedly.

In this example, the airframe 1 or part thereof is configurable in:

a third configuration, wherein the first cell 10A and the second cell 10B are mutually coupled, wherein the second cell 10B and the third cell 10C are mutually coupled and wherein the first cell 10A and the third cell 10C are not mutually coupled.

In this example, the airframe 1 or part thereof is repeatedly configurable in the first configuration, in the second configuration and in the third configuration. That is, the first cell 10A, the second cell 10B and the third cell 10C may be mutually coupled and uncoupled, repeatedly.

In this example, an external shape, preferably cross-sectional shape, of the first structural profile 100A tessellates.

In this example, the external shape, preferably cross-sectional shape, of the first structural profile 100A comprises and/or is a hexagon.

In this example, the set of cells 10 comprises a composite material, for example a fibre reinforced composite material such as including carbon fibre. In this example, the first structural profile 100A and/or the second profile 100B comprises such a composite material.

FIGS. 5A-5D schematically depict transverse cross-sections of airframes or parts thereof according to exemplary embodiments.

Figure 5A:
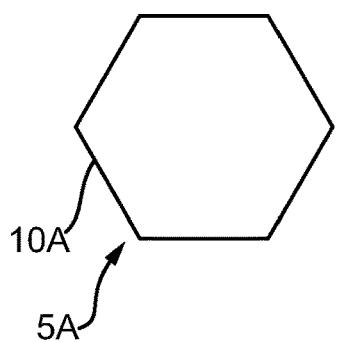
FIGS. 5A-5D schematically depict transverse cross-sections of airframes or parts thereof according to exemplary embodiments.

In more detail, FIG. 5A schematically depicts a transverse cross-section of an airframe 5A or part thereof wherein the set of cells 10 includes 1 cell 10A.

Figure 5B:
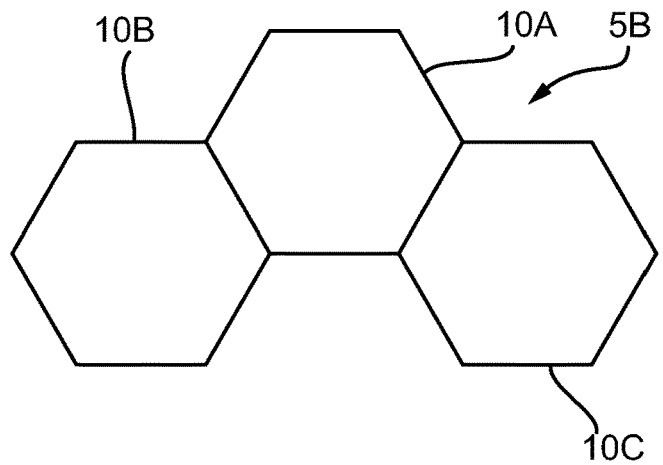

In more detail, FIG. 5B schematically depicts a transverse cross-section of an airframe 5B or part thereof wherein the set of cells 10 includes 3 cells 10A, 10B, 10C wherein the first cell 10A and the second cell 10B are mutually coupled, wherein the first cell 10A and the third cell 10C are mutually coupled and wherein the second cell 10B and the third cell 10C are not mutually coupled.

Figure 5C:
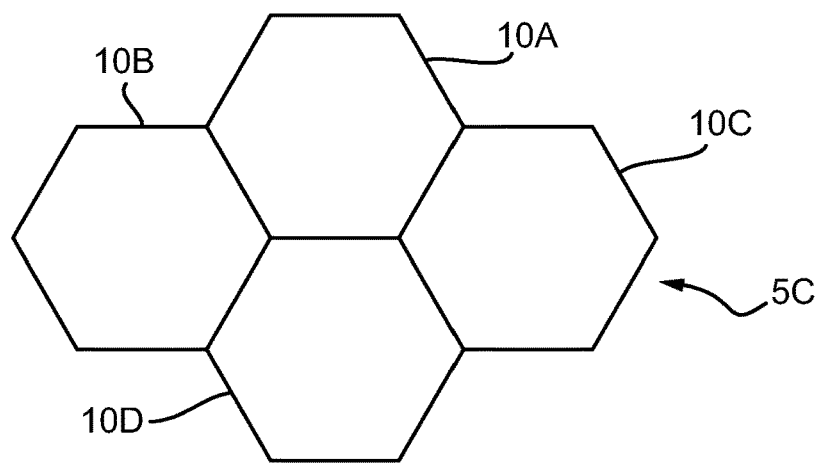

In more detail, FIG. 5C schematically depicts a transverse cross-section of an airframe 5C or part thereof wherein the set of cells 10 includes 4 cells 10A, 10B, 10C, 10D wherein the first cell 10A and the second cell 10B are mutually coupled, wherein the first cell 10A and the third cell 10C are mutually coupled, wherein the second cell 10B and the third cell 10C are not mutually coupled, wherein the first cell 10A and the fourth cell 10D are mutually coupled, wherein the second cell 10B and the fourth cell 10D are mutually coupled and wherein the third cell 10C and the fourth cell 10D are mutually coupled.

Figure 5D:
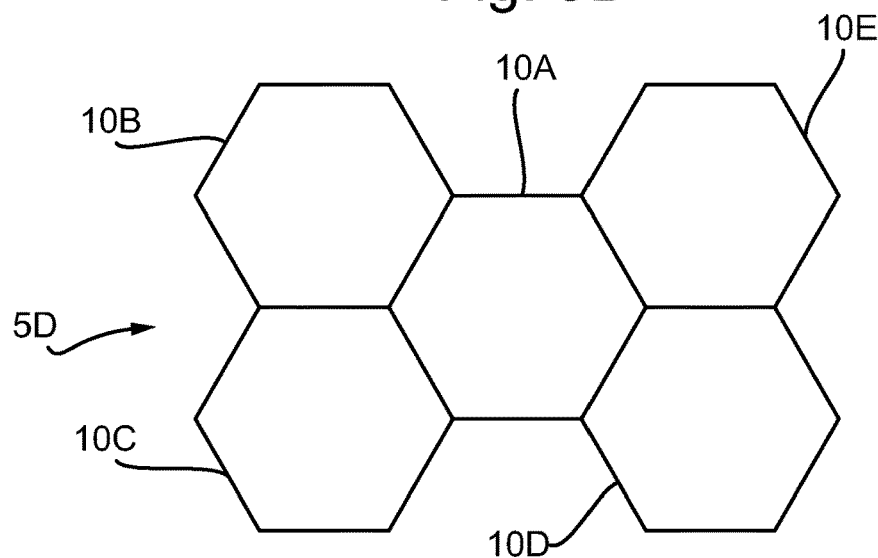

In more detail, FIG. 5D schematically depicts a transverse cross-section of an airframe 5D or part thereof wherein the set of cells 10 includes 5 cells 10A, 10B, 10C, 10D, 10E wherein the first cell 10A and the second cell 10B are mutually coupled, wherein the first cell 10A and the third cell 10C are mutually coupled, wherein the first cell 10A and the fourth cell 10D are mutually coupled, wherein the first cell 10A and the fifth cell 10E are mutually coupled, wherein the second cell 10B and the third cell 10C are mutually coupled, wherein the fourth cell 10D and the fifth cell 10E are mutually coupled, wherein the second cell 10B and the fourth cell 10D are not mutually coupled, wherein the second cell 10B and the fifth cell 10E are not mutually coupled, wherein the third cell 10C and the fourth cell 10D are not mutually coupled and wherein the third cell 10B and the fifth cell 10E are not mutually coupled.

Figure 6A:
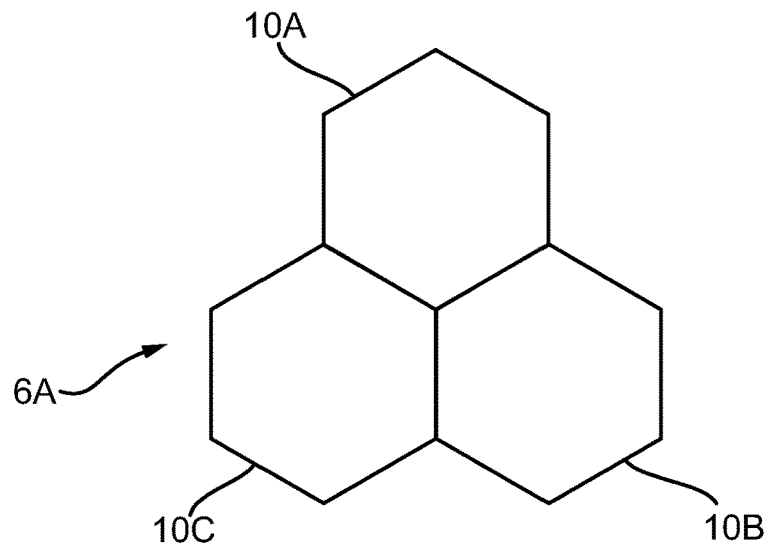
FIGS. 6A-6B schematically depict transverse cross-sections of airframes or parts thereof according to exemplary embodiments.
Figure 6B:
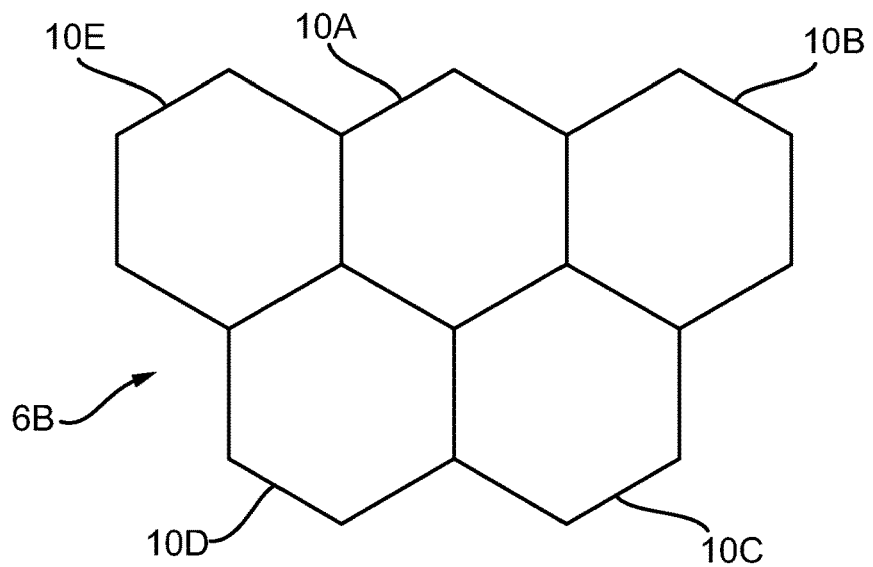

FIGS. 6A-6B schematically depict transverse cross-sections of airframes or parts thereof according to exemplary embodiments.

In more detail, FIG. 6A schematically depicts a transverse cross-section of an airframe 6A or part thereof wherein the set of cells 10 includes 3 cells 10A, 10B, 10C wherein the first cell 10A and the second cell 10B are mutually coupled, wherein the first cell 10A and the third cell 10C are mutually coupled and wherein the second cell 10B and the third cell 10C are mutually coupled.

In more detail, FIG. 6B schematically depicts a transverse cross-section of an airframe 6B or part thereof wherein the set of cells 10 includes 5 cells 10A, 10B, 10C, 10D, 10E wherein the first cell 10A and the second cell 10B are mutually coupled, wherein the first cell 10A and the third cell 10C are mutually coupled, wherein the first cell 10A and the fourth cell 10D are mutually coupled, wherein the first cell 10A and the fifth cell 10E are mutually coupled, wherein the second cell 10B and the third cell 10C are mutually coupled, wherein the third cell 10C and the fourth cell 10D are mutually coupled, wherein the fourth cell 10D and the fifth cell 10E are mutually coupled, wherein the second cell 10B and the fourth cell 10E are not mutually coupled, wherein the second cell 10B and the fifth cell 10E are not mutually coupled and wherein the third cell 10C and the fifth cell 10D are not mutually coupled.

Figure 7:
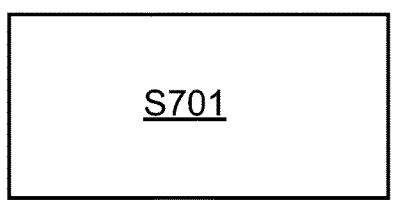
FIG. 7 schematically depicts a method of assembling an airframe or part thereof according to an exemplary embodiment.

FIG. 7 schematically depicts a method of assembling an airframe or part thereof according to an exemplary embodiment. Particularly, the method is of assembling an airframe or part thereof comprising a set of modular cells, including a first cell comprising a set of profiles including: a first structural profile and enclosing a first volume providing a first passageway; and a second profile, having a second length and enclosing a second volume.

At S701, the second profile is inserted into the first passageway.

The method may comprise any of the steps described herein.

Figure 8A:
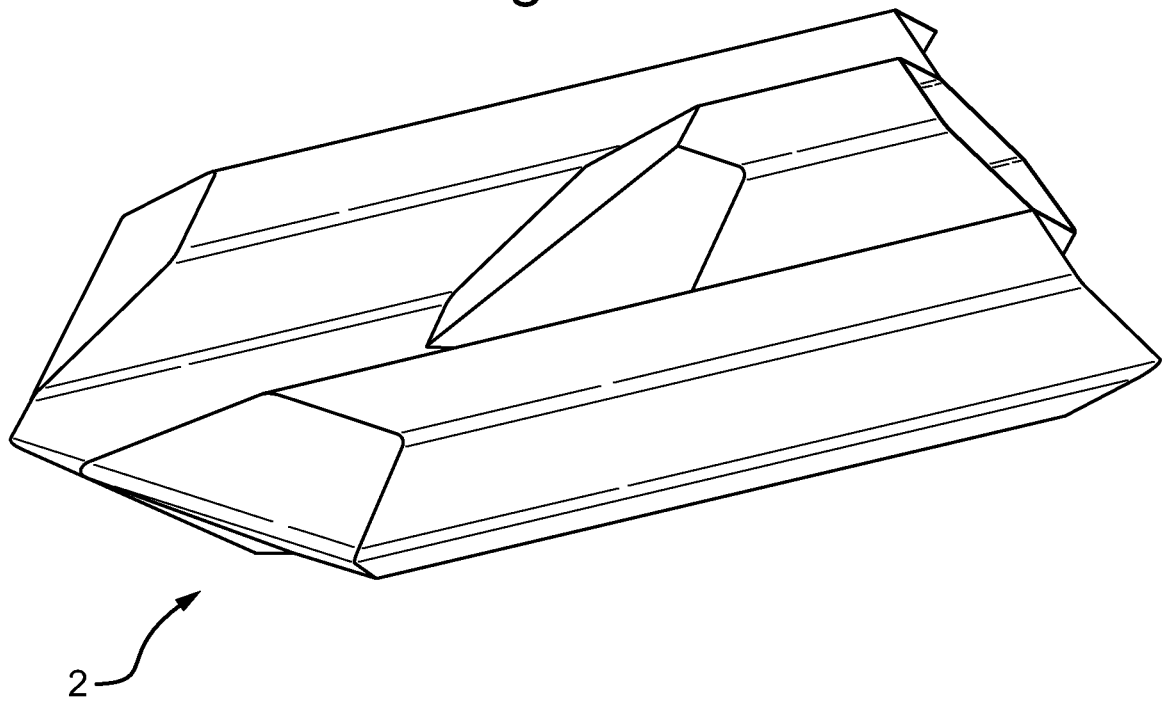
FIGS. 8A-8B schematically depict perspective views of a watercraft frame or parts thereof according to exemplary embodiments.
Figure 8B:
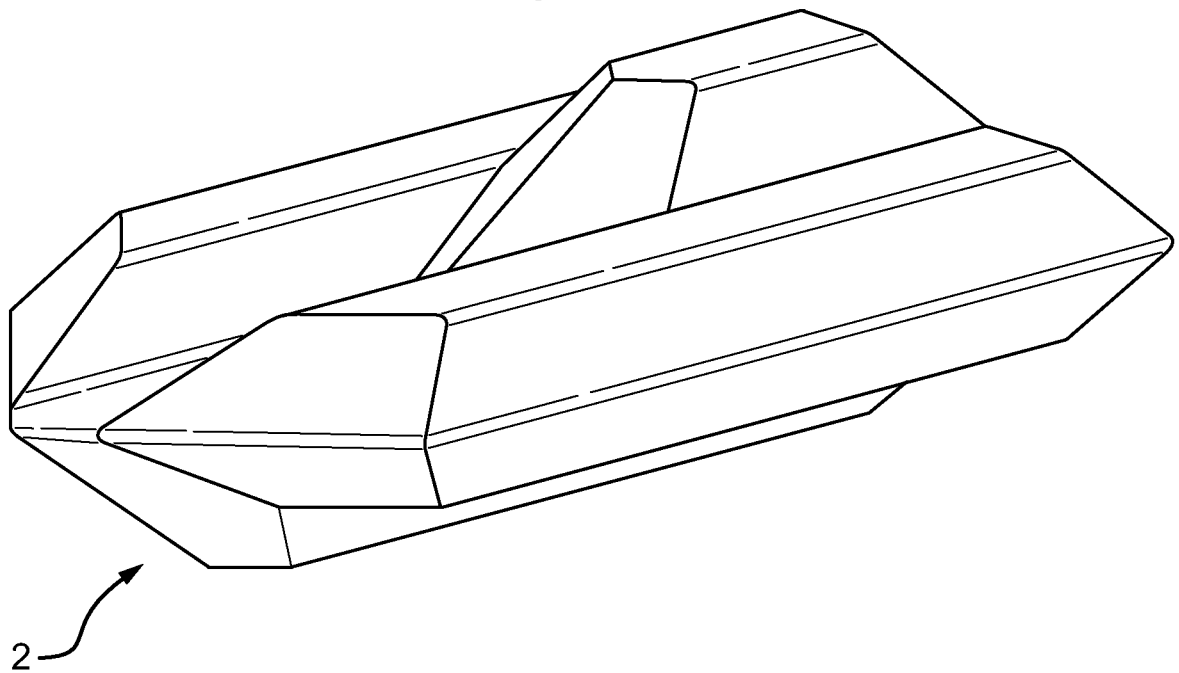

FIGS. 8A-8B schematically depict perspective views of a watercraft frame 2 or part thereof according to exemplary embodiments.

The watercraft frame 2 is generally as described with respect to the airframe 1 of FIG. 1.

Figure 9:
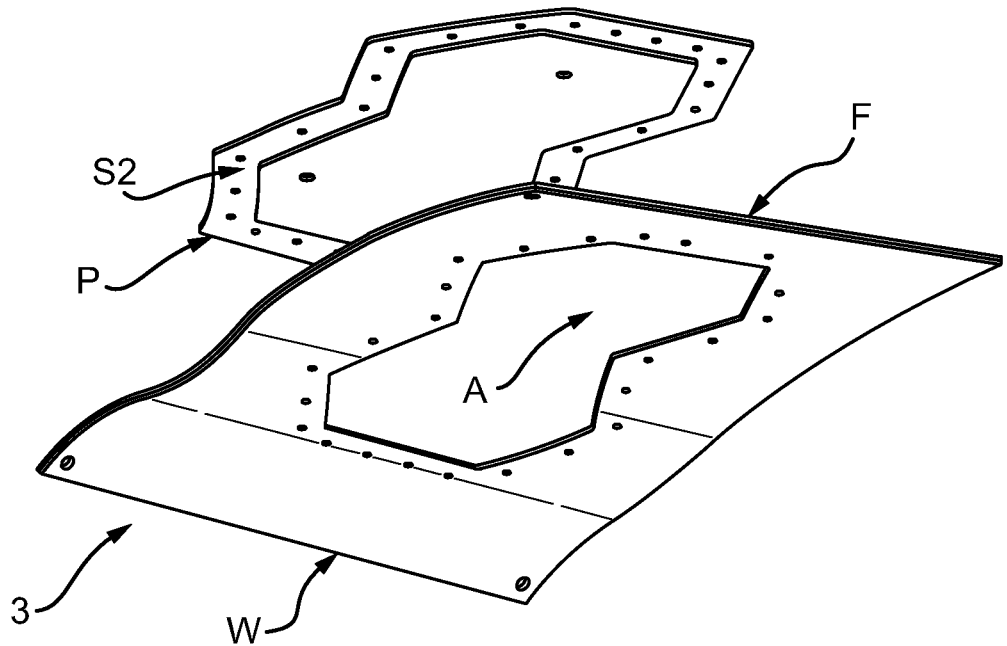
FIG. 9 schematically depicts an airframe or part thereof according to an exemplary embodiment, configured in a first configuration.

FIG. 9 schematically depicts an airframe or part thereof 3 according to an exemplary embodiment, configured in a first configuration. Particularly, FIG. 9 shows a perspective view of the airframe or part thereof 3, from below.

Figure 10:
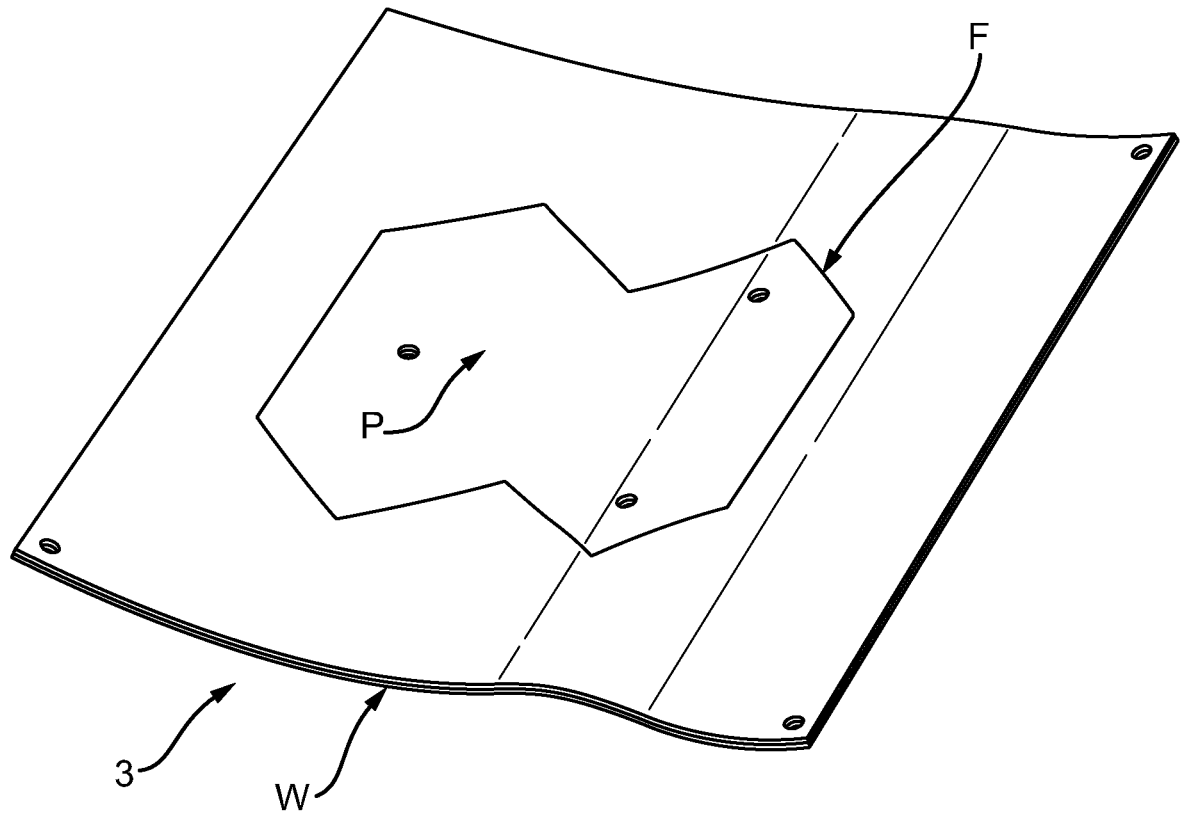
FIG. 10 schematically depicts the airframe or the part thereof of FIG. 9, configured in a second configuration.

FIG. 10 schematically depicts the airframe or the part thereof 3 of FIG. 9, configured in a second configuration. Particularly, FIG. 10 shows a perspective view of the airframe or part thereof 3, from below.

Figure 11:
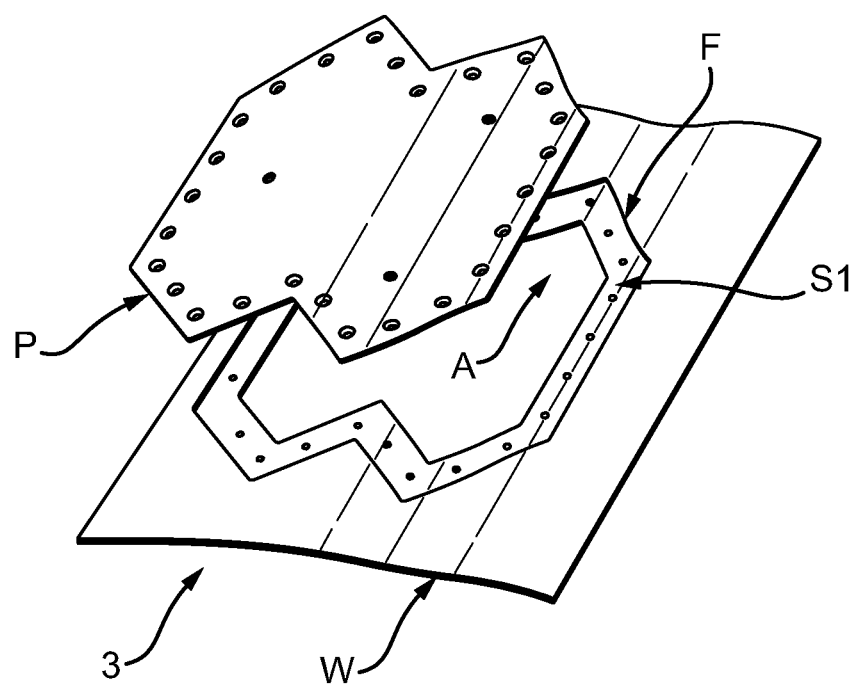
FIG. 11 schematically depicts the airframe or the part thereof of FIG. 9, configured in the first configuration.

FIG. 11 schematically depicts the airframe or the part thereof 3 of FIG. 9, configured in the first configuration. Particularly, FIG. 11 shows a perspective view of the airframe or part thereof 3, from above.

Figure 12:
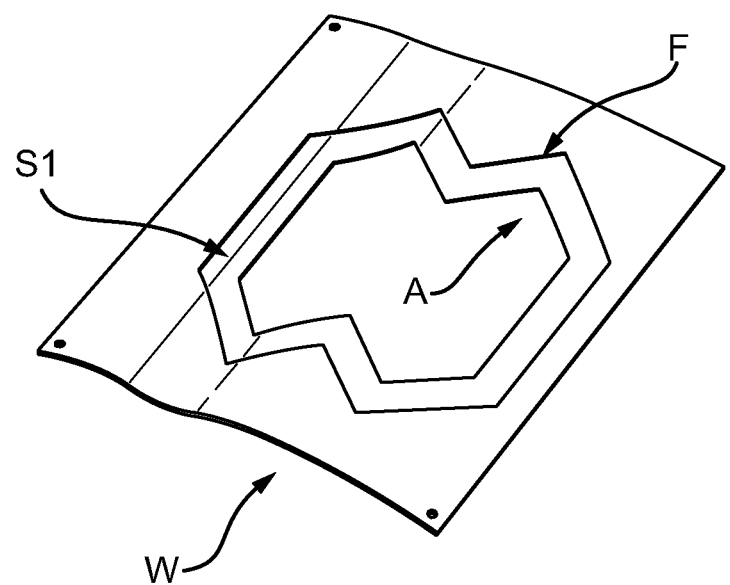
FIG. 12 schematically depicts a wall of the airframe or the part thereof of FIG. 9, in more detail.

FIG. 12 schematically depicts a wall W of the airframe or the part thereof 3 of FIG. 9, in more detail. Particularly, FIG. 12 shows a perspective view of the wall W, from above.

Figure 13:
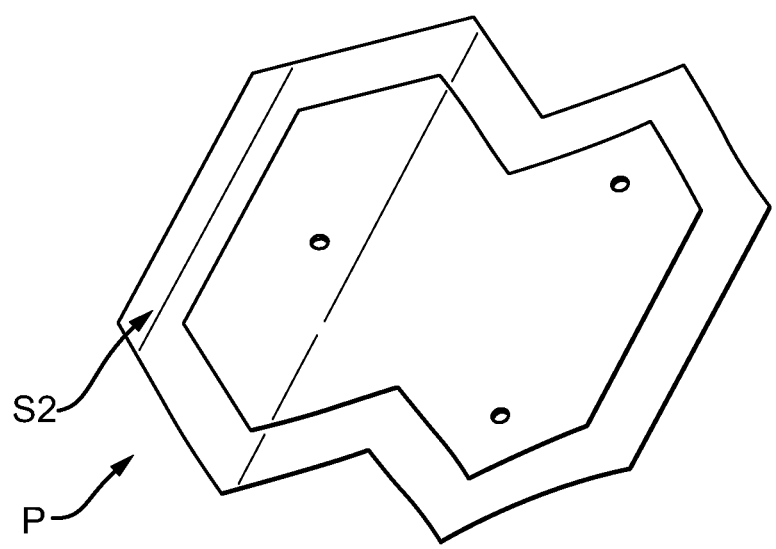
FIG. 13 schematically depicts a panel of the airframe or the part thereof of FIG. 9, in more detail.

FIG. 13 schematically depicts a panel P of the airframe or the part thereof 3 of FIG. 9, in more detail. Particularly, FIG. 13 shows a perspective view of the panel P, from below.

In this example, the airframe or a part thereof 3, for example a skin assembly comprises:

a wall W having an aperture A therethrough, wherein the wall W provides a frame F surrounding, at least in part, the aperture A;

a panel P conforming with the aperture A; and wherein the airframe or the part 3 thereof is configurable in:

a first configuration, wherein the panel P and the frame F are mutually spaced apart; and a second configuration, wherein the panel P is received in the frame F and wherein the frame F resists movement of the panel P in two or three mutually orthogonal directions.

In this example, the aperture A and the panel P have angular figure of 8 shapes.

In this example, the frame F defines a female coupling member and wherein the panel P defines a mating male coupling member.

In this example, the frame F includes a first shoulder S1 (also known as a rabbet or landing region), wherein the panel P includes a second shoulder S2 and wherein respective surfaces of the first shoulder S1 and the second shoulder S2 confront and/or contact in the second configuration.

In this example, respective thicknesses of the wall W and of the panel P are substantially similar, wherein a ratio of the respective thicknesses is 1:1.

In this example, the wall W and the panel P comprise a composite material or a plurality thereof.

In this example, the airframe or the part 2 thereof is a skin assembly and the wall W comprises and/or is a skin.

Figure 14:
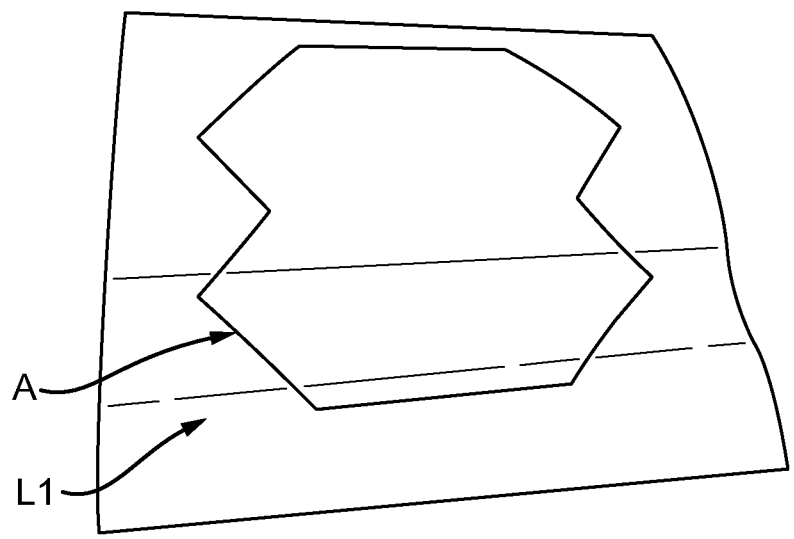
FIG. 14 is a photograph of an airframe or part thereof according to an exemplary embodiment, during manufacture.

FIG. 14 is a photograph of an airframe or part thereof 4 according to an exemplary embodiment, during manufacture. Particularly, FIG. 14 shows a first layer L1 of a set of layers, as described above. The outline of the aperture A therein is shown.

Figure 15:
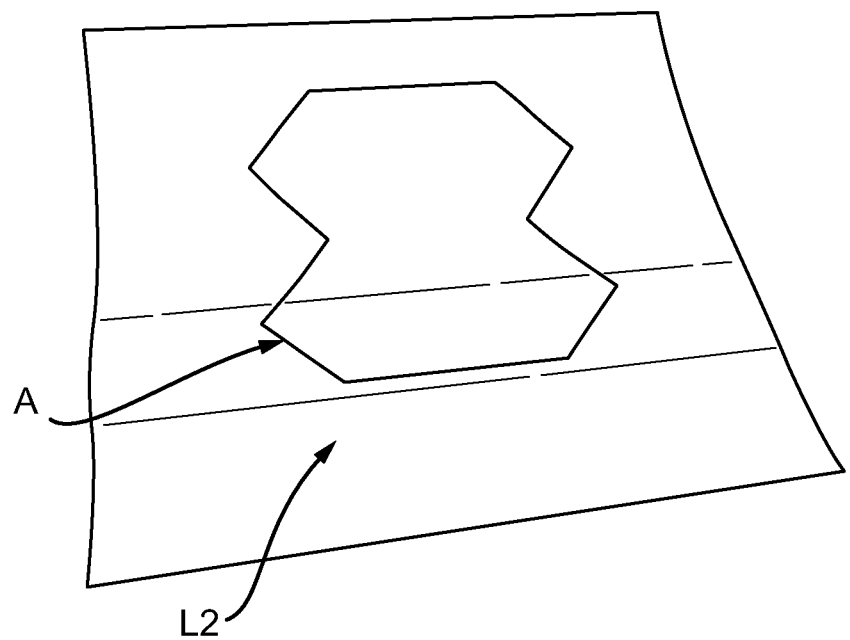
FIG. 15 is a photograph of an airframe or part thereof according to an exemplary embodiment, during manufacture.

FIG. 15 is a photograph of an airframe or part thereof 4 according to an exemplary embodiment, during manufacture. Particularly, FIG. 15 shows a second layer L2 of the set of layers, as described above. The outline of the aperture A therein is shown.

Figure 16:
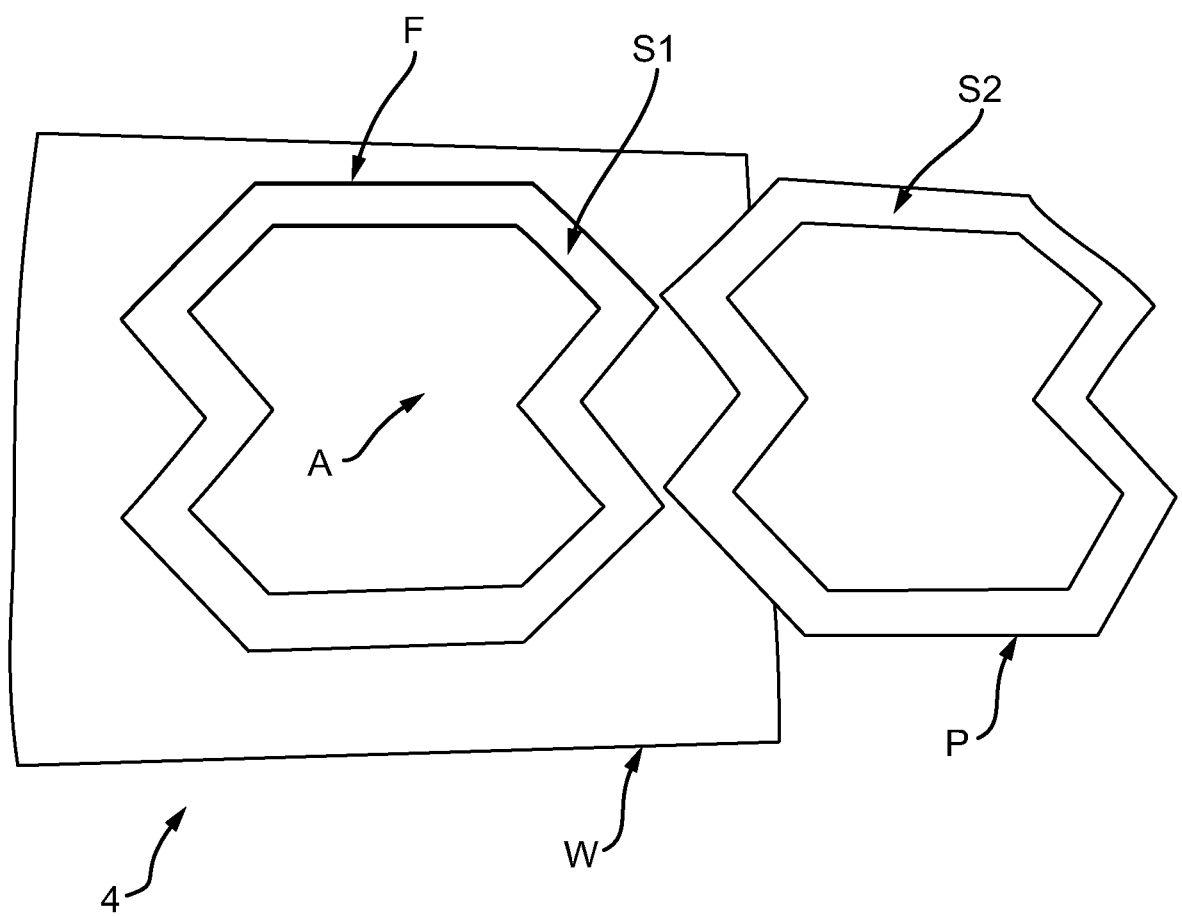
FIG. 16 is a photograph of an airframe or part thereof according to an exemplary embodiment.

FIG. 16 is a photograph of an airframe or part thereof 4 according to an exemplary embodiment. The airframe or a part thereof 4 is generally as described with respect to the airframe or a part thereof 3 of FIGS. 9 to 13.

Figure 17:
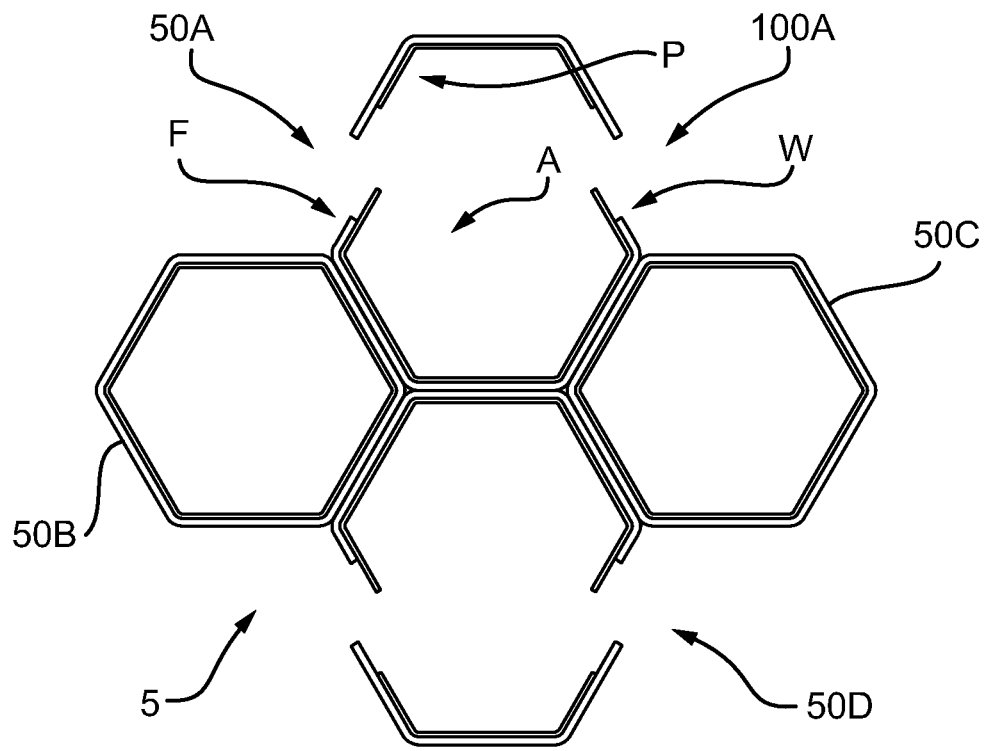
FIG. 17 schematically depicts an airframe or part thereof according to an exemplary embodiment, configured in a first configuration.

FIG. 17 schematically depicts an airframe or part thereof 5 according to an exemplary embodiment, configured in a first configuration. Particularly, FIG. 17 shows an end elevation view of the airframe or part thereof 5.

Figure 18:
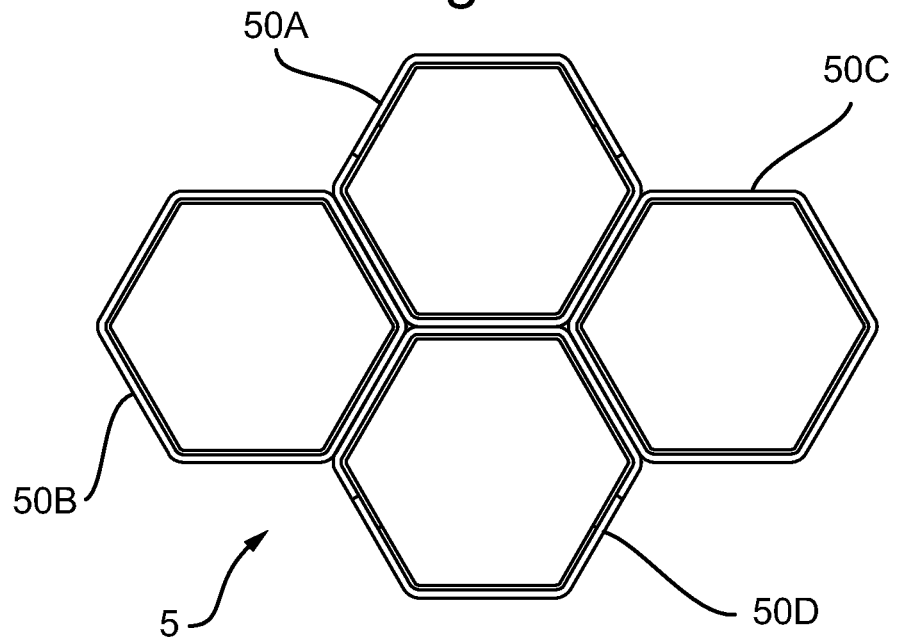
FIG. 18 schematically depicts the airframe or part thereof of FIG. 17, configured in a second configuration.

FIG. 18 schematically depicts the airframe or part thereof 5 of FIG. 17, configured in a second configuration. Particularly, FIG. 18 shows an end elevation view of the airframe or part thereof 5.

Figure 19:
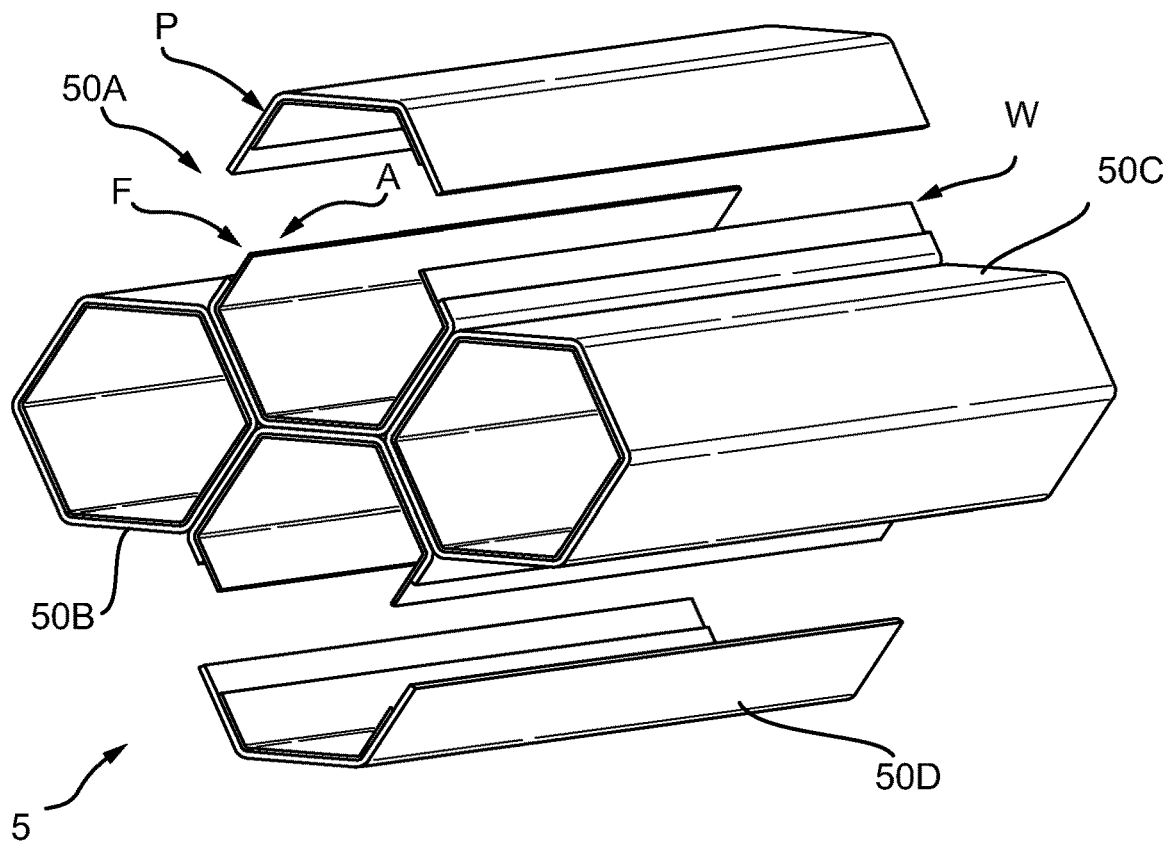
FIG. 19 schematically depicts the airframe or part thereof of FIG. 17, configured in a first configuration.

FIG. 19 schematically depicts the airframe or part thereof 5 of FIG. 17, configured in a first configuration. Particularly, FIG. 19 shows a perspective view of the airframe or part thereof 5.

Figure 20:
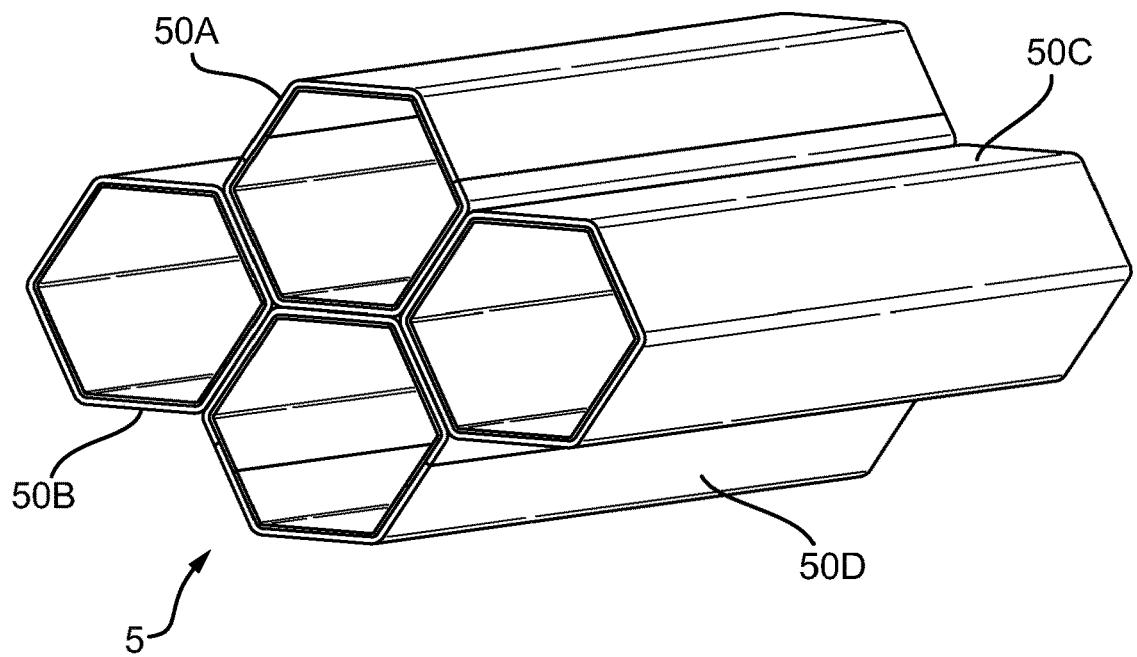
FIG. 20 schematically depicts the airframe or part thereof of FIG. 17, configured in a second configuration.

FIG. 20 schematically depicts the airframe or part thereof 5 of FIG. 17, configured in a second configuration. Particularly, FIG. 20 shows a perspective view of the airframe or part thereof 5.

The airframe or part thereof 5 is generally as described with respect to FIG. 5C. In more detail, the airframe or part thereof 5 comprises a set of cells 50 including 4 cells 50A, 50B, 50C, 50D.

The first cell 50A and the fourth cell 50D, particularly the first structural profile 100A, each comprise:

a wall W having an aperture A therethrough, wherein the wall W provides a frame F surrounding, at least in part, the aperture A;

a panel P conforming with the aperture A; and wherein the airframe or the part thereof 50A, 50D is configurable in:

a first configuration, wherein the panel P and the frame F are mutually spaced apart; and a second configuration, wherein the panel P is received in the frame F and wherein the frame F resists movement of the panel P in two or three mutually orthogonal directions.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

What is claimed is:

1. A method of manufacturing an airframe or a part thereof, wherein the airframe or part thereof comprises a wall having an aperture therethrough and a panel conforming with the aperture, the method comprising:

stacking a set of layers, including a first layer comprising a first composite material precursor and a second layer comprising a second composite material precursor, wherein stacking the set of layers comprises including a release sheet between the first layer and the second layer;

curing the first composite material precursor and the second composite material precursor of the stacked first layer and the second layer, thereby providing a first composite material and a second composite material therefrom, respectively;

separating the stacked first layer and the second layer, wherein the first layer and the second layer comprise the first composite material and the second composite material, respectively;

removing the release layer from between the separated first layer and the separated second layer;

excising a first portion and a correlated second portion respectively from the separated first layer and from the separated second layer, thereby providing therein respectively a first passageway and a correlated second passageway;

restacking and mutually coupling the set of layers, thereby providing the airframe or the part thereof, wherein restacking and mutually coupling the set of layers comprises:

restacking the first layer and the second layer having therein respectively the first passageway and the correlated second passageway and mutually coupling the restacked first layer and second layer, thereby providing the wall, wherein the wall has an aperture therethrough provided by the first passageway and the correlated second passageway and wherein the wall provides a frame surrounding, at least in part, the aperture;

restacking the excised first portion and the correlated second portion and mutually coupling the restacked excised first portion and the correlated second portion, thereby providing a panel corresponding to the aperture.

2. The method according to claim 1, comprising providing the first layer and/or the second layer, at least in part, by fibre placement, braiding, knitting and/or weaving.

3. The method according to claim 1, wherein excising the first portion and the correlated second portion respectively from the separated first layer and from the separated second layer comprises thermal cutting.

4. The method according to claim 1, wherein a first gap between the excised first portion and the first passageway in the first layer is at most 500 μm.

* * * * *